(12) United States Patent
Chtchetkine et al.

(10) Patent No.: US 6,363,400 B1
(45) Date of Patent: Mar. 26, 2002

(54) NAME SPACE EXTENSION FOR AN OPERATING SYSTEM

(75) Inventors: Vladimir Chtchetkine, Irvine; Alan Kucheck, Santa Ana; Guennadi Terechtenko, Irvine, all of CA (US)

(73) Assignee: Starbase Corp., Santa Ana, CA (US)

( * ) Notice: Subject to any disclaimer, the term of this patent is extended or adjusted under 35 U.S.C. 154(b) by 0 days.

(21) Appl. No.: 09/274,214

(22) Filed: Mar. 23, 1999

Related U.S. Application Data

(63) Continuation of application No. 09/255,831, filed on Feb. 22, 1999.

(51) Int. Cl.[7] .............................................. G06F 17/30
(52) U.S. Cl. .................... 707/200; 707/10; 707/201; 345/700
(58) Field of Search ..................... 707/10, 200, 201; 345/700

(56) References Cited

U.S. PATENT DOCUMENTS

| | | | |
|---|---|---|---|
| 4,757,438 A | 7/1988 | Thatte et al. ............... | 709/100 |
| 5,029,077 A | 7/1991 | Fatahalian et al. .......... | 345/418 |
| 5,129,088 A | 7/1992 | Auslander et al. ............. | 711/1 |
| 5,193,184 A | 3/1993 | Belsan et al. .................. | 711/4 |
| 5,394,532 A | 2/1995 | Belsan ........................ | 711/114 |
| 5,404,477 A | 4/1995 | Jippo ......................... | 711/203 |
| 5,410,709 A | 4/1995 | Yu ............................. | 710/269 |
| 5,483,647 A | 1/1996 | Yu et al. ..................... | 713/100 |
| 5,574,862 A | 11/1996 | Marianetti, II .............. | 710/100 |
| 5,606,681 A | 2/1997 | Smith et al. ................. | 711/203 |
| 5,634,096 A | 5/1997 | Baylor et al. ................ | 714/6 |
| 5,638,517 A | 6/1997 | Bartek et al. ................ | 709/246 |
| 5,696,640 A | 12/1997 | Satoh .......................... | 360/61 |
| 5,752,005 A | 5/1998 | Jones .......................... | 703/22 |
| 5,809,285 A | 9/1998 | Hilland ....................... | 703/25 |
| 5,831,606 A | 11/1998 | Nakajima et al. .......... | 345/891 |
| 5,832,299 A | 11/1998 | Wooten ........................ | 710/9 |
| 6,185,574 B1 * | 2/2001 | Howard et al. .............. | 707/200 |

* cited by examiner

Primary Examiner—Paul R. Lintz
(74) Attorney, Agent, or Firm—Arter & Hadden LLP

(57) ABSTRACT

An operating system with a plurality of Native File System Drivers and related Device Drivers is provided with an installable Virtual File System Driver and a Virtual Device Driver for providing file access services to the Operating System through the Native File System Drivers by substituting a view application to provide a customized view of the defined part of the virtual file system.

9 Claims, 11 Drawing Sheets

| Name | Status | Locked By | Reserved By (for) | Size | Type | Modified | Attributes |
|---|---|---|---|---|---|---|---|
| hlp | In View | | | | File Folder | 2/17/99 3... | R |
| res | In View | | | | File Folder | 2/17/99 3... | R |
| tes219 | In View | | | | File Folder | 2/17/99 3... | R |
| User Manual | In View | | | | File Folder | 2/17/99 4... | R |
| lpframe.h | Missing | | | 2KB | H File | 2/17/99 4... | |
| Mainfrm.cpp | Missing | | | 4KB | CPP File | 12/30/98 ... | |
| Mainfrm.h | Missing | | | 2KB | H File | 2/17/99 4... | |
| Makehelp.bat | Missing | | | 2KB | MS-DOS Batch... | 1/12/99 1... | |
| Pendlg.cpp | Missing | | | 2KB | CPP File | 2/17/99 4... | |
| Pendlg.h | Missing | | | 2KB | H File | 2/17/99 4... | |

NAME SPACE EXTENSION FOR AN OPERATING SYSTEM

RELATED APPLICATIONS

This application is a continuation of application Ser. No. 09/255,831 filed Feb. 22, 1999, which is incorporated herein by reference.

NOTICE OF COPYRIGHTS AND TRADE DRESS

A portion of the disclosure of this patent document contains material, which is subject to copyright protection. This patent document may show and/or describe matter, which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates generally to data processing systems and, more particularly, to object oriented data management. The present invention further relates to visual representation of data as files stored on logical drives.

2. Description of Related Art

A computer operating system represents a collection of computer programs or routines which control the execution of application programs and that may provide services such as resource allocation, scheduling, input/output control, and data management. Most operating systems store logical units of data in files, and files are typically grouped in logical units of folders. Folders are themselves files which identify the files assigned to them and a folder can store other folders. Folders are sometimes also referred to as directories. An interrelated collection of files is called a file system.

Most file systems have not only files, but also data about the files in the file system. This data typically includes time of creation, time of last access, time of last write, time of last change, file characteristics (e.g., read-only, system file, hidden file, archive file, control file), and allocation size.

Most operating systems are designed to shield applications from direct interaction with the hardware which actually store file systems. File systems typically are stored in mass storage devices. A mass storage is a device having a large storage capacity, and may be read-write (e.g., a hard disk drive) or read-only (e.g., a CD-ROM drive). Some mass storage devices, for example RAID systems, comprise a collection of mass storage devices. Mass storage devices also typically have the quality of non-volatility.

Most contemporary operating systems, and Windows NT/95/98 in particular, have layered models of drivers where each layer has a particular set of responsibilities. On the lowest level there are drivers that work directly with hardware (mass storage devices, network cards, buses, etc.). Higher level drivers communicate with lower level drivers in order to exchange information between the hardware the user. A driver for one type of mass storage device will differ from a driver for another type of mass storage device, and both of these drivers will differ from a driver used to interface the operating system to a printer.

Typical hard disk drives store data in minimum units of sectors. Sectors on a hard disk drive typically comprise an addressable subdivision of a track used to record one block of data on the hard disk drive. Hard disk device drivers typically provide services for reading sectors from a hard disk drive and writing sectors to the hard disk drive. The hard disk device driver typically relates to the data only on the sector-level, and cannot relate to the data on a file system level.

The storage space of a mass storage device is logically divided into one or more logical disks also known as partitions. Conversely, drivers are available which will treat a group of mass storage devices as a single logical disk. In Windows operating systems, each logical disk is served by a disk device driver which also holds a drive designation, C:, D:, E:, etc. Windows operating systems don't limit logical disks being part of a mass storage device. For example, a RAM disk uses part of the computer's operating memory as a storage of its sectors.

The task of interfacing applications to the contents of a logical disk is assigned to a file system driver. A file system driver is a collection of function routines and file management structures that perform various tasks related to files and folders stored in logical disks. The function routines of a file system driver are used to open specified files, read specific blocks of data, write specific blocks of data, and close files. A file system driver is a significant portion of an operating system. File system drivers uses the services of a disk device driver to read sectors, translate sector data and give the user lists of files stored on the hard disk drive.

The structure of data stored in a logical disk is file system-dependent. For example, the FAT file system requires a logical disk to have a boot sector that describes location of File Allocation Tables (FAT) sectors and root directory sectors within this disk. Other file systems, such as NTFS, HPFS, etc. operate with different data structures and are incompatible with the structures of other file systems.

The process of coupling a file system driver and a disk device driver is called "mounting of the file system on the disk device." When the operating system detects a new disk device in the system, the operating system sends a mount request to each file system driver that is currently registered with the operating system. The mount request includes a number of parameters, including a reference to the disk device driver that serves the new disk device. When a registered file system driver receives a mount request, the file system driver reads predefined sectors from the disk using services of the disk's device driver in order to check if data structures in the sector correspond to what is expected by this file system. If a file system driver recognizes the expected data structures, the file system driver returns a code to the operating system which indicates that the file system driver will serve all of the file requests for the new disk device. At this point the mount process is complete. A disk device with a mounted file system is also known as a volume.

As operating systems become more complex, file systems likewise become more complex. A file system for a computer network operating system may have hundreds of function routines. The vast majority of these function routines may provide seldom used, obscure functions not needed for basic file operations. Moreover, complex operating systems are often configured to optimize performance for specific types of devices. Typically, hard disk access performance is optimized because hard disks are capable of high data transfer rates and such access occurs nearly continuously in the operation of many computers and computer networks.

The organization of files within typical file systems of conventional operating systems is relatively inflexible. Conventional operating systems provide dividing a hard disk into several logical drives of varying size. Once the hard disk has been configured as one or more logical drives, alteration of the configuration is very difficult. Although the conventional operating systems permit changes to the logical drive configuration, this reconfiguration typically results in the destruction of the data in the reconfigured logical drives. Thus, before reconfiguring logical drives, the files stored on the logical drive must be backed up, and after reconfiguration, the files must be restored. This process of reconfiguring logical drives is very burdensome and exposes the files to damage. Furthermore, in most operating systems, only high level users, such as system administrators, have the security rights and skills to reconfigure logical drives. As a result, once a logical drive has been configured in a conventional operating system, it is rarely reconfigured.

Another characteristic of conventional operating systems, file system drivers and disk device drivers is that the contents of the logical drives cannot be customized. Conventional operating system such as Windows NT permit multiple users to have access to the files in a logical drive. However, the hierarchical representation of how the files are stored in the logical drive is identical for all users. Conventional operating systems include security means which may be used to limit access of certain users to certain files or parts of a logical drive. However, this does not alter the fact that there is only one hierarchical representation of how the files are stored in the logical drive.

Conventional operating systems are also limited in their visual representation of information about the files stored on logical drives. Conventional operating systems maintain only limited file information, such as date and time of creation and modification, user access rights, and size. However, beyond this basic file information attributes, the conventional operating systems do not store other attributes that the files may have obtained. For example, some types of data repository systems are known which store considerable amounts of information about files. This additional information includes version tracking and access tracking. The conventional operating systems do not store such additional information, and they also lack the ability to display the additional information. More particularly, the visual displays of files and file information through an operating system typically cannot be changed except through extensive alteration of the viewer.

One solution to these problems is to create and install a custom file system which replaces or otherwise augments the pre-existing or "native" file system. Such a custom file system could be designed to allow freer reconfiguration, and to allow storage and display of more file information. However, implementing the hundreds of function routines included in a file system is an exceptionally complex task. If successful, the resulting custom file system would be an undesirably large and complex program which would be difficult to successfully debug, and cost an excessive amount to create.

Another solution is to provide an enterprise document management system (EDMS). An EDMS includes a database and is installed on top of an existing file system. The database itself comprises one or more files, and the objects which users would otherwise view as files are actually stored as records in the database. The major limitation of EDM systems is that they are not compatible with applications which are also installed on the operating system. To provide this compatibility, the applications must be modified to access the EDM database instead of the logical drives. Yet, by doing so, access to the logical drives from the applications becomes inconvenient and sometimes impossible. Furthermore, the users must be trained on the EDM system and how to use each specially modified application. Installation of an EDMS entails transfer of existing files into the EDM database. Such modifications, training and installation can entail huge expenses and severe workflow disruptions.

Another solution is shown in U.S. Pat. No. 5,752,005. In that patent a computer includes an operating system having a system manager and a native file system. An installable file system installs hooks at a core interface between the system manager and the native file system. Hooks are installed for only a portion of the many native function routines provided by the native file system. A virtual driver communicates with the native file system and simulates a file storage device having substantially no files stored thereon. This system is designed to provide access to foreign devices having a foreign file system. Foreign file system device requests for function routines that have not been hooked are handled by the native file system and virtual device. Foreign file system device requests for hooked function routines are handled by a foreign file system. This system is considered inadequate to solve the above-identified problems because it continues to be limited to the conventional single hierarchical representation of how the files are stored in the relevant mass storage devices. Furthermore, this system requires full implementation of the major file system routines, while preserving cache coherency and consistency. These major file system routines—open, read, write, close, etc., are the most complex and expensive parts of a file system driver to develop.

SUMMARY OF THE INVENTION

The method comprises devices and methods for providing an installable file system using a basic file system driver, and for providing flexibility in the views of objects through an operating system.

In accordance with one aspect of the invention, there is a method of organizing files in an data processing system. The data processing system comprises an operating system, a native file system comprising native folders and native files, a first mass storage device having a native disk in which the native file system is stored, and a native file system driver for interfacing the operating system to the native file system. The method comprises first installing a virtual file system driver. Next, the virtual file system driver creates virtual disks having respective virtual file systems. The virtual file systems comprise virtual folders and virtual files. The virtual file systems include, for each virtual folder, a reference to a one of the native folders, and for each virtual file a reference to a one of the native files. The method further includes receiving requests to open specified virtual files, and invoking the native file system driver to open the native files referenced by virtual file system for the specified virtual files.

In accordance with one aspect of the invention, there is a data processing system comprising an operating system responsive to file access service requests of applications programs. The data processing system further comprises one or more mass storage devices, each mass storage device comprising one or more native disks. Each native disk stores a single native file system. The native file systems comprise native files, and the native file systems include names, attributes and locations of the respective native files stored in the native file system. The data processing system further comprises one or more native file system drivers, each native file system driver comprising function routines and file management structures for providing file access services to the operating system with respect to at least one of the native file systems. The native file system drivers each provide a single representation of the respective native file systems. The data processing system further comprises a virtual file system driver comprising function routines and file management structures for providing file access services to the operating system with respect to virtual files. At least one virtual file comprises a logical representation in a virtual file system of a one of the native files. The logical representations comprises a mapping of the one native file to the at least one virtual file. The virtual file system driver emulates the virtual file system to the operating system as an additional native file system. The virtual file system driver represents the structure of the virtual file systems in a user-defined manner without restriction as to the location of any particular native file in any particular native file system. The virtual file system driver, in response to a file access request for a one of the virtual files mapped from a native file, invokes the native file system driver which is associated with the native file system having the mapped native file, the invocation including a reference to the mapped native file.

In accordance with another aspect of the invention there is a method of representing data as files in a data processing system. The data processing system comprises an operating system having a default view component for providing default file attributes of files in a file system in a default view. The default view component of the operating system is accessible to applications programs. The data processing system further comprises one or more mass storage devices. Each mass storage device comprises one or more logical disks. Each logical disk stores a file system, the file systems comprising files, the file systems including names, attributes and locations of the respective files stored in the respective file systems. The data processing system further comprises one or more file system drivers. Each file system driver comprises function routines and file management structures for providing file access services to the operating system with respect to at least one of the file systems. The file system drivers each provide a single representation of the respective file systems. The data processing system also comprises a view application for providing configurable views of the files in the file systems. The configurable views include custom file attributes which are not available in the default views provided by the default view component of the operating system. The method comprises requesting by one of the applications programs a first view of a first defined part of one of the file systems. The method further comprises the default view component of the operating system providing a default view of the first defined part. The method further comprises requesting by one of the applications programs a second view of a second defined part of one of the file systems. The method further comprises substituting the view application for the default view component of the operating system with respect to the second defined part. The method further comprises the view application providing a non-default view of the second defined part.

In accordance with another aspect of the invention there is another method of representing data as files in a data processing system. The data processing system comprises a mass storage device. The mass storage device comprises a native disk storing a native file system. The native file system comprises plural native files. The native file system includes default file information for each file including a name, an attribute and a location of the file. The data processing system further comprises an operating system having a default view component for providing the default file information in a default view. The default view component of the operating system being accessible to applications programs. The data processing system further comprises a native file system driver. The native file system driver comprises function routines and file management structures for providing file access services to the operating system with respect to the native file system. The native file system driver provides a single representation of the native file systems. The method comprises installing a virtual file system driver in the data processing system. The virtual file system driver comprises function routines and file management structures. The method further comprises the virtual file system driver emulating a virtual file system to the operating system as an additional native file system. The virtual file system comprises virtual files, each virtual files representing an object. The method further comprises storing in the virtual file system user interface class identifier of the view application. The method further comprises a one of the applications programs requesting a view of a defined part of the virtual file system. The method further comprises substituting a view application for the default view component of the operating system with respect to the defined part of the virtual file system. The method further comprises loading the view application. The method further comprises the view application providing a custom view of the defined part of the virtual file system, the custom view including custom attributes relating to the objects.

Other aspects of the invention include devices, systems, programs and methods related to the matter described above.

DESCRIPTION OF THE DRAWINGS

Further objects of this invention, together with additional features contributing thereto and advantages accruing therefrom, will be apparent from the following description of a preferred embodiment of the present invention which is shown in the accompanying drawings with like reference numerals indicating corresponding parts throughout and which is to be read in conjunction with the following drawings, wherein:

FIG. 10 is another screen shot of a custom view of a virtual file system in accordance with the invention.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.

Data Processing System Overview

Figure 1:
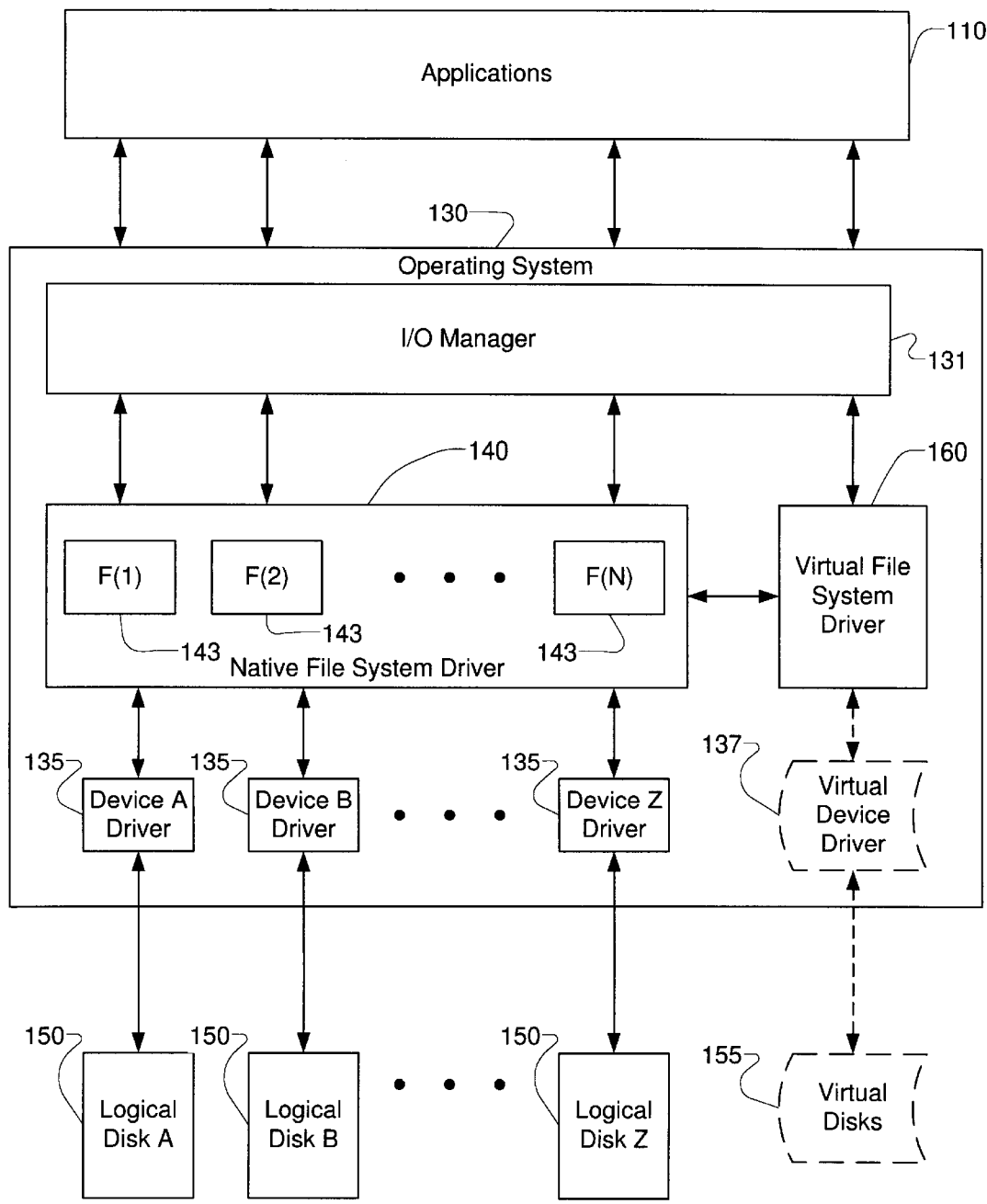
FIG. 1 is a block diagram of a collection of computer programs installed on a computer in accordance with the present invention.

FIG. 1 shows a block diagram of a collection of computer programs installed in a data processing system 100 such as a computer workstation. FIG. 1 illustrates computer programs arranged in a hierarchy with applications 110 at the top of FIG. 1 and mass storage devices having one or more volumes 150 located at the bottom. Applications 110 are high level computer programs which accomplish specific tasks. Often, these tasks are the uses which justify the existence of the data processing system, and applications 110 are desirably configured to be easily transportable from data processing system to data processing system. The data processing system may include other devices and their drivers, such as printers, network interfaces, etc.

For purposes of the present invention, the operating system 130 is described herein in a manner consistent with Windows NT operating system. However, those skilled in the art should appreciate that different operating systems, such as Windows 98, Novell NetWare and Unix, have similar features and functions and that the present invention is not limited to use only in connection with the Widows NT operating system. One salient feature of these operating systems is that they permit installation of drivers, particularly file system drivers. In the preferred embodiment, the operating system 130 provides for installable file systems.

The operating system 130 comprises an I/O manager 131, a native file system driver 140, and device drivers 135 as known in the art. In some operating systems, the I/O manager 131 comprises a system manager which manages RAM, coordinates multiple access at the same time, and performs numerous other functions. In accordance with the invention, the operating system further includes virtual file system driver 160.

As used herein, "native file system driver" is used to differentiate file system drivers from the virtual file system driver 160. It is within the scope of the invention for a "native file system driver" to be inherent to the operating system or to be installed into the operating system. Although the virtual file system driver of the invention will normally be installed after the native file system drivers, it is within the scope of the invention for native file system drivers to be installed after the virtual file system drivers are installed. A "native file system" is used herein to refer to a file system which is recognized by the operating system, but is not the virtual file system of the invention. A "native disk" as used herein refers to the object commonly referred to as a logical disk drive.

The data processing system includes a number of data flows. Data flows between I/O manager 131 and higher level programs, such as applications 110. Data flows between I/O manager 131 and the file system drivers 140, 160. Data flows between the native file system driver 140 and the mass storage device drivers 135 as known in the art. Data flows between the mass storage device drivers 135 and the native disks 150 as known in the art. In accordance with the invention, data flows between the virtual file system driver 160 and the native file system driver 140.

The native file system driver 140 includes a multiplicity of function routines 143. FIG. 1 identifies function routines 143 using the nomenclature of F(1), F(2), . . . F(N). In more complex operating systems, native file system driver 140 includes hundreds of function routines 143. Function routines 143 are called by higher level programs m response to requests for specific services to be performed with respect to a specific device. In a very general sense, the requested services relate to transferring data and to managing the transfer of data. Function routines 143, with the help of lower level software and the hardware devices, perform the requested services.

The virtual file system driver 160, along with other computer programs described below serves a role in simulating the existence of the virtual disks 155 in accordance with the principles of the present invention.

The virtual file system driver 160 is accessed from the I/O manager 131 in precisely the same manner as the native file system driver 140. An important benefit of the virtual file system driver 160 is that the virtual file system driver 160 permits any number of virtual volumes 155 to be created and manipulated. Each virtual disk 155 has its own virtual file system. Using the virtual file system driver 160, a user is able to map as virtual files on the virtual file system those native files from any native file system to which the user has access. This allows the user to create any number of file hierarchies, eliminating the need, for example to alter disk partitions.

As indicated above, folders are a species of file which identify the files assigned to them, including other folders. Because of this property, references to files herein, whether native or virtual, should be understood to also refer to folders. In specific situations in this discussion, functionality with respect to folders is addressed.

Components which Enable Virtual File Systems

Figure 2:
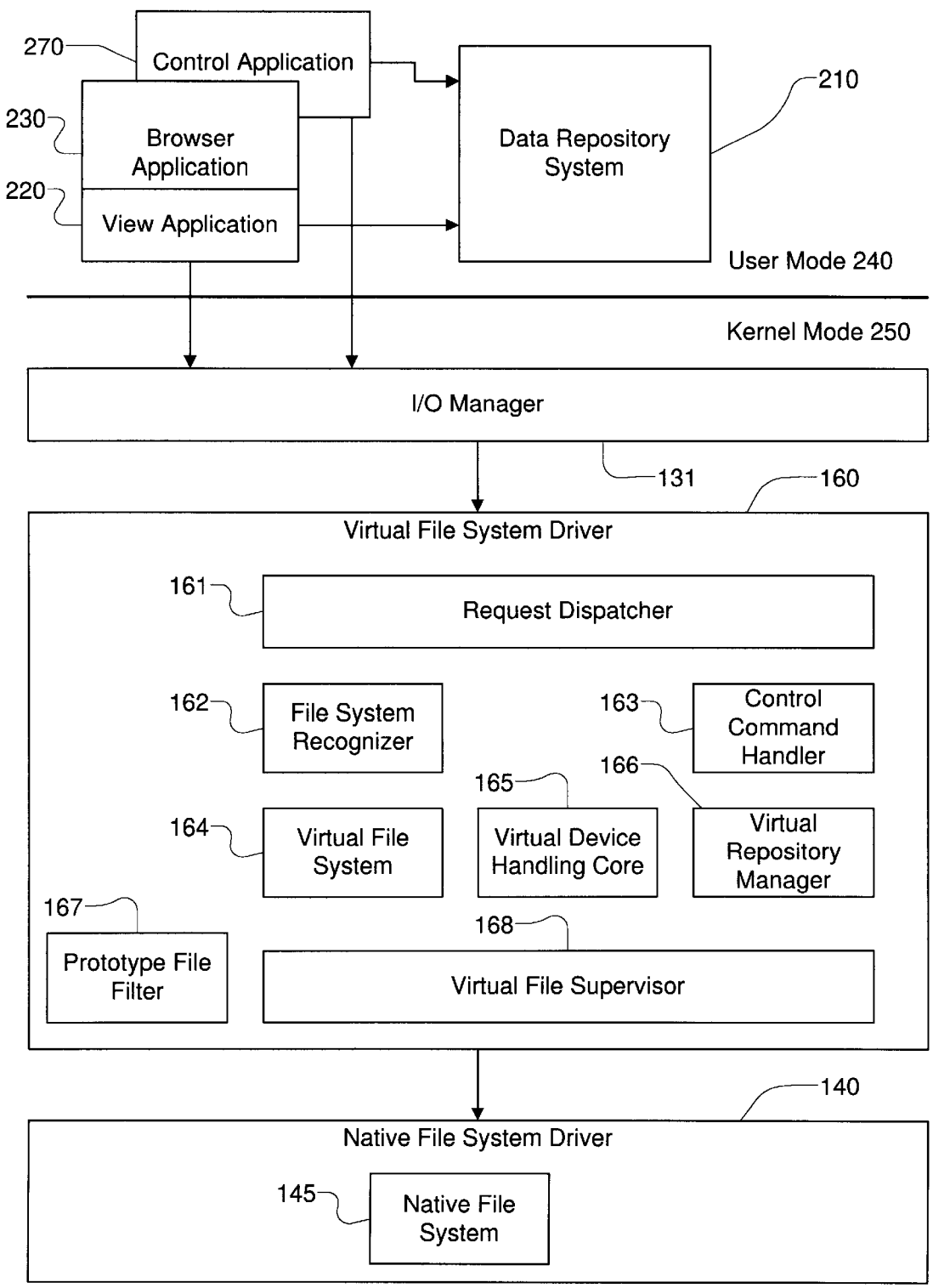
FIG. 2 is a block diagram of the system of the invention from an execution mode perspective.

FIG. 2 shows a block diagram of two execution modes, a user mode 240 and a kernel mode 250. These execution modes are defined in the Windows NT specifications, and are shown only as examples. Other operating systems may have different functional hierarchies but may be nonetheless compatible with the present invention.

The kernel mode 250 includes the I/O manager 131, virtual file system driver 160 and native file system driver 140 as described above with respect to FIG. 1. The native file system driver 140 is shown for exemplary purposes as having a native file system 145, though plural native file systems and plural native file system drivers are within the scope of the invention.

The user mode 240 includes a control application 270, a browser application 230, a view application 220. By "browser application," it is meant an application which allows a user to view file systems. For example, most user applications are browser applications because they permit users to view file systems as part of the file open process.

The user mode 240 further includes a data repository system 210. As used herein, a "data repository" is an aggregation of data which is kept and maintained in an organized way. As used herein, a "data repository system" comprises a data repository and special routines needed, if any, to access the data repository. A data repository system in accordance with the invention may be a version control system. Those skilled in the art will appreciate that the data repository system 210 may have a hierarchical structure. The data repository system 210 may provide one or more particular views of data in the data repository system 210, each of which may to certain parts of the data in the data repository system 210. In other words, the data repository includes containers and items, and it may have one or more views each of which covers a specified hierarchy of containers and items. A "container" is a collection of items within the data repository, and it is analogous to a folder. A container can contain other containers as well as items. An "item" is analogous to a common file and some items are, in fact, files. For example, a tip (or latest) file revision is a type of item which appears as a common file in the disclosed embodiment. Other types of revision items are preferably retrievable as files by "checking out" the specified file revision from the data repository system 210. Thus, an item should be considered as any item belonging to a data repository system that can be extracted from the data repository system and represented as a file.

In the preferred embodiment of the invention, the virtual file system driver 160 and the control application 270 provide integration of certain aspects of the data repository system 210 with the native file system 140. In particular, the control application 270 interfaces with the virtual file system driver 160 and the data repository system 210 to provide the virtual file system driver 160 with a list of items and containers in the data repository system 210 that should be represented as virtual files located on a virtual disk. The control application 270 also interfaces with the data repository system 210 to extract and store in the native disk 150 the items and containers which will serve as prototypes to virtual files.

In the preferred embodiment, the control application 270 communicates with the virtual file system driver 160 using privately defined I/O control commands transferred via the API of the Win32 subsystem. The control application 270 can optionally also access the data repository system 210 via available interfaces (i.e., APIs) of the data repository system 210.

One embodiment of the invention is StarDisk 4.0. The StarDisk User's Guide is included as an Appendix and is incorporated herein by reference.

The Control Application

The control application 270 has two primary functions. First, the control application 270 represents the contents of the data repository system 210, such as in the disclosed embodiment, a set of views that may be mapped to the virtual disks 155. Second, the control application 270 allows a user to create virtual disks 155 and to determine which items and containers from the data repository system 210 will be mapped to virtual file systems on the virtual disks 155. Preferably, users may interact with the control application 270 through user interface devices such as windows and dialogs in the manner known in the art.

After the user selects the repository items and containers to be mapped to his virtual file system, the control application 270 works with the virtual file system device driver 160 to create or modify the user's virtual disk 155. In particular, the control application 270 issues commands to define the virtual files to be represented on the virtual disk 155, and also to define the attributes of the virtual disk 155.

In accordance with the Windows NT operating system, the control application 270 preferably communicates with the virtual file system driver 160 by issuing control commands via DeviceIoControl API of Win32 subsystem. The virtual file system driver 160 communicates with the control application 270 by signaling an event object that is shared between the virtual file system driver 160 and the control application 270. When the control application 270 detects that the event object is in the signaled state, the control application 270 issues control commands to the virtual file system driver 160 and obtains the requested data. The issuance of control commands and the use of event objects are well known programming techniques for the Windows NT operating system. Event objects allow program threads to coordinate their activities.

The Virtual File System Driver

The virtual file system driver 160 services I/O requests sent by the I/O manager 131 on behalf of the control application 270 as well as on behalf of other applications that gain access to the virtual files stored in the virtual file system 164. As explained further below, the control application 270 can request that the virtual file system driver 160 create one or more device objects that represent virtual disks and mount virtual file systems on the virtual disks 155.

Once a virtual file system has been mounted, the virtual file system driver 160 can service file system I/O requests with respect to the mounted virtual file system sent by the I/O manager 131 on behalf of the user applications 110. Preferably, the virtual file system driver 160 uses the control application 270 to obtain from the data repository system 210 the location of native files that serve as prototypes to virtual files. The virtual file system driver 160 also uses the control application 270 to extract prototype files which have been requested but which are not present on a native disk 150. The virtual file system driver 160 also uses the control application 270 to obtain a list of items and containers from the data repository system 210 that should be represented as virtual files and virtual folders. Finally, the virtual file system driver 160 uses the native file system driver 140 when responding to requests for accesses to the virtual files. The requested file access may be, for example, open, close, read or write.

In the Windows NT operating system 130, when a program thread opens a handle to a file object, the I/O manager 131 determines from the file object's name which driver the I/O manager 131 must call to process requests relating to the virtual file. The I/O manager 131 uses driver objects and device objects to achieve this. A driver object represents an individual driver in the data processing system 100 and records for the I/O manager 131 the address of each of the driver's dispatch routines (entry points). A device object represents a physical, logical or virtual device in the data processing system 100 and describes the device's characteristics, such as the alignment the device requires for buffers and the location of the device's queue to hold incoming I/O request packets. When a driver is loaded into the data processing system 100, the I/O manager 131 creates a driver object, then calls the driver's initialization routine so that the driver object is filled with the driver's entry points.

The virtual file system driver 160 includes function routines which parallel the function routines of the native file system 140. However, the function routines of the virtual file system 160, in general, provide calls to the parallel function routines of the native file system 140. Open, read and write requests are typically the most complex function routines in a file system driver, yet in accordance with the invention, the function routines for open, read and write requests are very simple—essentially calls to the open, read and write functions of the native file system 140. Some of the function routines of the virtual file system 160 are handled differently, though this is only a small number and the routines are relatively straightforward to create. Through the virtual file system driver 160, each virtual disk 155 has a device object, and each virtual disk 155 looks to the operating system 130 as if it were a real device. A driver object is associated with the virtual file system driver 160.

In one embodiment, the virtual file system driver 160 comprises a control command handler 163, a file system recognizer 162, a virtual repository manager 166, a virtual device handling core 165, a virtual file system 164, a virtual file supervisor 168, a prototype file filter 167, and a request dispatcher 161. The virtual file system driver 160 may be structured in other ways without departing from the invention. These components are described further below as one example of how to embody the virtual file system driver 160.

The control command handler 163 is responsible for interfacing the control application 270 with other components of the virtual file system driver 160. In the preferred embodiment this is achieved by representing the control command handler 163 with a named device object accessible to the control application 270. The control application 270 opens this device object via Win32 function CreateFile as applied to opening device objects. Once the device object has been opened the control application 270 can call it using Win32 function DeviceloControl. On behalf of this function the I/O manager 270 sends an IRP_MJ_DEVICE_CONTROL request to the control command handler's device object, supplying the request with parameters passed to DeviceloControl by the control application 270.

In order to support calls directed from components of the virtual file system driver 160 to the control application 270, the control command handler 163 and the control application 270 use a shared event object that is set to signaled state when the control command handler needs to call the control application 270. When the control application 270 detects that the shared event object is set to the signaled state, it sends a special request (as described above) to the control command handler 163. After handling this special request the control command handler 163 returns to the control application 270 a description of the required data. After the control application 270 receives the required data description, the control application 270 prepares the required data and calls the control command handler 163, submitting the required data as request parameters.

In addition to the above described special requests the control command handler 163 also handles requests received from the control application for creating and deleting virtual disks.

The virtual device handling core 165 receives and handles I/O requests for the virtual disks 155. In particular, the virtual device handling core 165 handles the following Windows NT standard I/O requests: IRP_MJ_CREATE; IRP_MJ_CLOSE; IRP_MJ_CLEANUP; IRP_FILE_SYSTEM_CONTROL; IOCTL_DISK_GET_MEDIA_TYPES; IOCTL_DISK_GET_DRIVE_GEOMETRY; IOCTL_DISK_GET_PARTITION_INFO; IOCTL_DISK_VERIFY; IOCTL_DISK_IS_WRITABLE. The implementation of these I/O requests is within the skill of the ordinarily skilled artisan and therefore not explained here in detail.

The file system recognizer 162 is registered with the operating system 130 as a device object of the FILE_TYPE_DISK FILE_SYSTEM type. The file system recognizer 162 services the IRP_MJ_FILE_SYSTEM_CONTROL request with the minor code IRP_MN_MOUNT_VOLUME. Upon receiving of such request, the file system recognizer 162 determines if the request is for mounting a virtual file system on a virtual disk 155. The file system recognizer 162 does this by comparing a device object passed as a parameter of the mount request with device objects stored in the list of available virtual disks. If none of device objects stored in the list of available virtual disks matches the given device object, the file system recognizer 162 completes the request with a code identifying that the requested device was not recognized.

Once an appropriate device object has been located in the list of available virtual disks, the file system recognizer 162 mounts a virtual file system on the corresponding virtual disk 155. This is preferably achieved by the file system recognizer 162 invoking the IoCreateDevice service routine to create a device object of type FILE_DEVICE_DISK_FILE_SYSTEM that represents the virtual file system mounted on the virtual disk 155. After the virtual file system device object has been created, the file system recognizer 162 creates a descriptor of a repository view (that includes the repository containers and items) destined to be mapped on the virtual disk, and couples the descriptor of the repository view with the device object representing the virtual file system.

After the device object has been coupled with a descriptor of the repository view, the file system recognizer 162 inserts a pointer to the virtual file system device object into the DeviceObject field of the volume parameter block (VPB) that is passed as one of the mount request parameters. Next, the file system recognizer 162 inserts a pointer to the device object representing the virtual file system into the list of available virtual disks. Then the file system recognizer 162 reports the successful completion of the mount request to the I/O manager 131.

The virtual file system 164 is a component coupled with a device object that represents a virtual disk 155. The virtual file system 164 is mounted on the virtual disk 155 and is registered with the operating system as a device object of the FILE_TYPE_DISK_FILE_SYSTEM type.

The virtual file system 164 appears as a conventional file system intended to service I/O requests for accessing what appear to be ordinary, native-type files and folders that reside on a virtual disk 155. Unlike conventional file systems, however, the virtual file system 164 services I/O requests directed to virtual files and virtual folders in such a way that most I/O requests are actually handled and completed by the native file system driver 140.

When the virtual file system 164 handle IRP_MJ_CREATE request is sent by the I/O manager 131 on behalf of an application that opens a virtual file or virtual folder, the virtual file system 164 uses the virtual repository manager 166 to find or create a native file on a native disk 150 that serves as a prototype of the virtual file that is targeted by the IRP_MJ_CREATE request. Next, the virtual file system 164 corrects a file object structure created by the I/O manager 131 to represent a virtual file being opened on the virtual disk 155. Namely, the virtual file system 164 changes the DeviceObject field of file object structure that defines a virtual disk 155 where the corresponding file is located with the device object representing the native disk 150 where the prototype file is located. In addition, the virtual file system 135 changes the FileName field of the file object structure (that defines the pathname of the corresponding file) with the pathname of the prototype file on the native disk 150.

Next, the virtual file system 164 passes the modified request to an appropriate native file system driver 140. The native file system driver 140 handles the request as if it was received directly from the I/O manager 131. This provides two benefits. First, the file object is initialized in such a way that the I/O manager 131 will call the native file system driver 140 directly (bypassing the virtual file system driver 160) for all subsequent requests (read, write, close, etc.) directed to the virtual file or folder that was subject of the IRP_MJ_CREATE request. Second, the native file system driver 140 will be able to successfully handle these requests although they are actually issued on behalf of operations performed on a virtual file.

In addition to opening virtual files, the virtual file system 164 receives and handles I/O requests that pertain to the virtual disk 155 themselves. In particular, the virtual file system 164 handles IRP_MJ_QUERY_VOLUME_INFORMATION and IRP_MJ_SET_VOLUME_INFORMATION. The implementation of these I/O requests is within the skill of the ordinarily skilled artisan and therefore not explained here in detail.

The virtual repository manager 166 determines the contents of virtual folders being represented on the virtual disks 155, as well as locates and creates prototype files. The virtual repository manager 166 acts on behalf of the other components of the virtual file system driver 160 and interfaces with the control command handler 163 that provides access to the data repository system 210.

When interfacing with the control command handler 163, the virtual repository manager 166 creates command messages that are sent by the control command handler 163 to the control application 270. In particular, acting on behalf of the virtual file system 164, the virtual repository manager 166 creates command messages that provide obtaining the contents of a repository container. Furthermore, acting on behalf of the virtual file supervisor 168, the virtual repository manager 166 creates command messages for obtaining the location of a prototype file or folder on a native disk and for creating a prototype file if not present on the native disk 150. In addition, the virtual repository manager 166 creates descriptions that represent virtual files being opened on a virtual disk 155.

A file object extension appears as an extension to the file object structure created by the I/O manager 131 in conformity to a file being opened on a virtual disk 155. A file object extension contains a pointer to the file object created by the I/O manager 131 in conformity to a file being opened on a virtual disk 155. Next, a file object extension contains the pathname of a virtual file that addresses it on the virtual disk 155. Finally, a file object extension contains the pathname of an appropriate prototype that resides on a native disk 150. In other words, a file object extension provides multiple links between a file object created by the I/O manager 131, a location of the corresponded virtual file on the virtual disk 155, and a location of the corresponding prototype file on the native disk 150.

The virtual file supervisor 168 keeps track of operations performed on opened virtual files. The virtual file supervisor 168 also handles requests that require co-handling with the native file system driver 140. Namely, the virtual file supervisor 168 handles and co-handles IRP_MJ_CLEANUP, IRP_MJ_CLOSE, IRP_MJ_QUERY_INFORMATION, IRP_MJ_SET_INFORMATION and IRP_MJ_DIRECTORY_CONTROL I/O requests.

The prototype file filter 167 is a device object that is attached to the native file system driver 140 in accordance with the filter driver specification that is used in the Windows NT operating system. The prototype file filter 167 intercepts. I/O requests targeted to the native file system driver 140 and checks whether the intercepted I/O request pertains to a file that appears as a prototype of an opened virtual file. If so, then the prototype file filter 167 calls the virtual file supervisor 168 with the intercepted request or passes the request down to the native file system driver 140 depending on the request type. If the intercepted request is not targeted to a prototype file, the prototype file filter 167 simply passes the intercepted request down to the native file system driver 140.

The request dispatcher 161 receives the I/O requests sent by the I/O manager 131, identifies the device object that is targeted by the I/O request, and invokes the appropriate routine that is responsible for handling request of the given type. If the I/O request is targeted to the device object representing the control command handler 163, then the request dispatcher 161 invokes the control command handler 163 and passes the current request to it. If the I/O request is targeted to the device object representing the file system recognizer 162, then the request dispatcher 161 invokes the file system recognizer 162 and passes the current request to it. If the I/O request is targeted to a device object representing a virtual disk 155, then the request dispatcher 161 invokes the virtual device handling core 165 and passes the current request to it. If the I/O request is targeted to a device object representing the virtual file system 164, the request dispatcher 161 invokes the virtual file system 164 and passes the current request to it.

The virtual file system driver 160 maintains a list of available virtual disks 155 as well as a list of virtual disks 155 pending deletion. The virtual file system driver 160 uses these lists to account for available virtual disks 155. Each of the lists appears as a list of pointers to a data structure consisting of an assigned drive letter, a pointer to a device object that represent the respective virtual file system 164, and a pointer to a device object that represent a virtual disk. The virtual file system driver 160 also maintains a list of file object extensions and uses the lists to account for opened virtual files.

Operation of the System of the Invention

The operation of the system of the invention has several aspects. First, there are certain initialization operations. Second, there are operations relating to creating and deleting virtual disks. Third, there are operations relating to mounting and unmounting virtual file systems on virtual disks. Fourth, there are operations relating to file access services: open, close, delete, read and write. Fifth, there are operations relating specifically to virtual folders. It should be appreciated that the terms "file access service request," "file access request" and "I/O request" are used interchangeably herein.

For initialization, the virtual file system driver 160 includes a driver entry initialization routine referred to as the "driver initialization routine." The driver initialization routine is invoked by the I/O manager 131 and initializes the function pointers in the driver object structure including both the major function pointers to the dispatch routines and the function pointers to the fast I/O dispatch routines. As applied to the major function pointers the driver initialization routine initializes the entry points to all major function to the request dispatcher 161. As applied to the function pointers to the fast I/O dispatch routines the driver initialization routine initializes the different entry points to appropriate fast I/O routines. Next, the driver initialization routine creates a device object that represents the file system recognizer that is served to handle mount requests. In addition, the driver initialization routine creates a device object that represents the control command handler 163.

Creating and Deleting Virtual Disks

After initialization, the virtual file system driver 160 can create and delete virtual disks 155. There are at least two avenues for creating a new virtual disk. In the embodiment disclosed, the only avenue is for the user to first create a virtual file system, s and then to have a virtual disk created which is mapped to the virtual file system. However, a second avenue is also within the scope of the invention wherein the user has a new virtual disk created with an empty virtual file system. Only the former avenue is described in detail herein; embodying the latter avenue is within the skill of the ordinarily skilled artisan based upon this disclosure.

Figure 3:
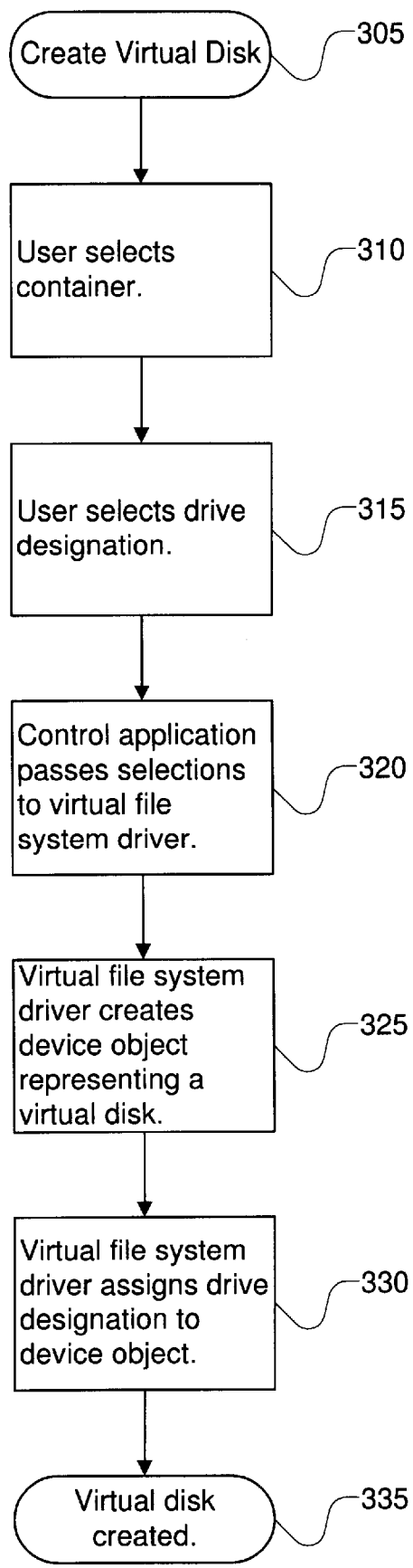
FIG. 3 is a flow chart of a process for creating a virtual disk in accordance with the invention.

Creation of a new virtual disk is described with reference to FIG. 3. When creating a virtual disk (step 305), a user preferably uses the control application 270 to select a container from the data repository system 210 (step 310). The selected container will act as a root folder for the new virtual disk. The control application preferably defaults the virtual folder's name to the name of the selected container, but also permits the user to select a different name for the virtual folder. Next, the control application 270 preferably suggests a drive designation to the user, and the user selects an available drive designation (step 315).

The control application 270 then instructs the virtual file system driver 160 to create a new virtual disk 155 from the user's selections (step 320). As explained above, the virtual file system driver 160 is responsive to control commands sent by the I/O manager 131 on behalf of the control application 270. When creating a virtual disk, the control application 270 preferably uses the Windows DeviceloControl function to send a control code and attributes of the new virtual disk directly to the control command handler 163. Preferably, the control command includes a designation of the selected drive letter as well as the selected attributes of the virtual disk The control command handler 163 creates a device object representing a virtual disk by using the IoCreateDevice( ) service routine (step 325). The control command handler 163 also creates a symbolic link to the device object by using the IoCreateSymbolicLink( ) service routine (step 330). In this way a required drive letter gets assigned to the created virtual disk. After the device object representing the virtual disk 155 has been created, the control command handler 163 inserts a pointer to the device object into the list of available virtual disks. At this point, the new virtual disk 155 will be recognized by the operating system 130 as if it were a native disk 150 (step 335). For example, an icon for the virtual disk will appear in the Windows Explorer within My Computer.

Figure 4:
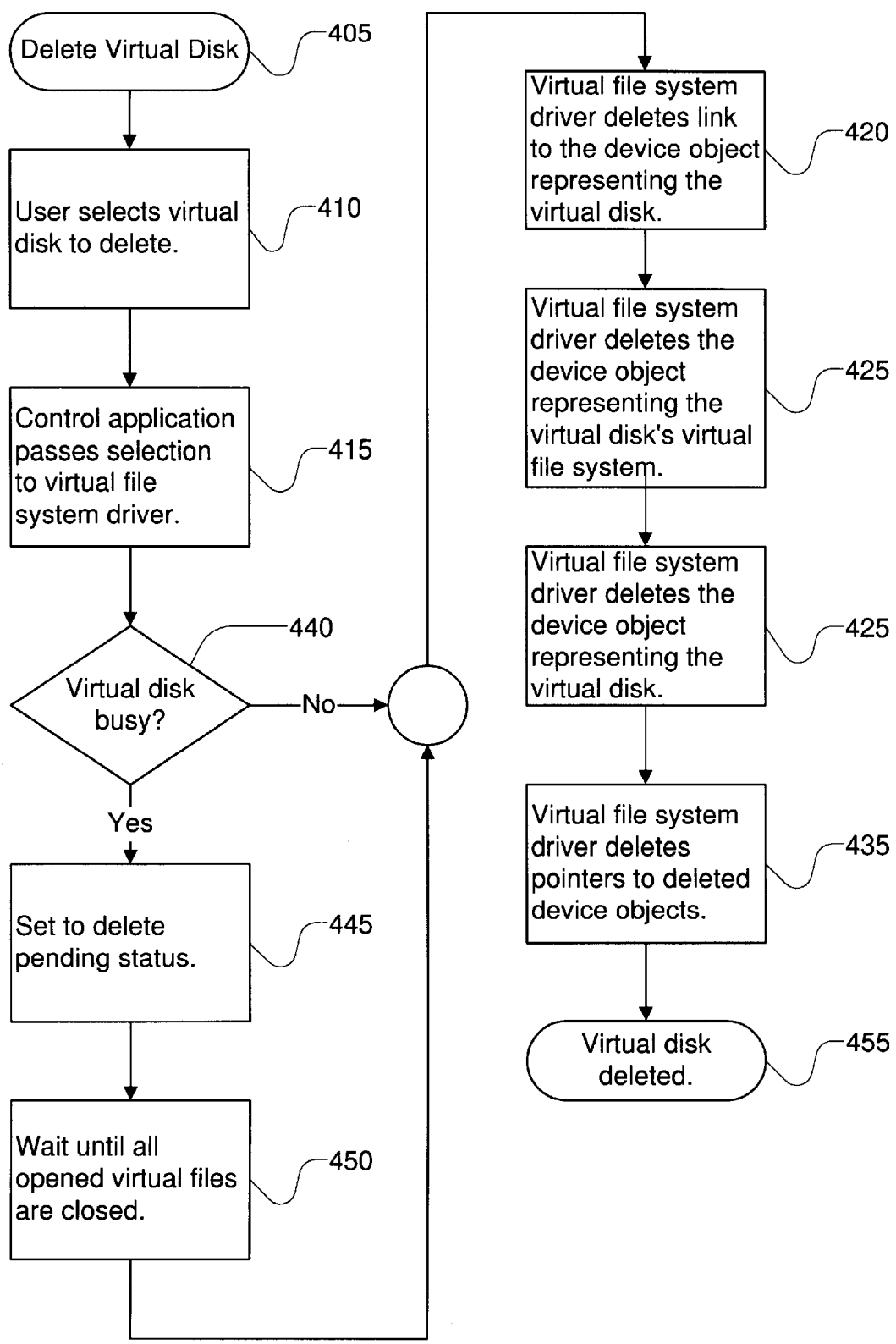
FIG. 4 is a flow chart of a process for deleting a virtual disk in accordance with the invention.

Deletion of a virtual disk is described with reference to FIG. 4. When deleting a virtual disk (step 405), a user preferably uses the control application 270 to select a virtual disk to delete (step 410). Preferably, in Windows, the control application 270 provides a context menu item for a dialog which permits the user to select a virtual disk for deletion. After the user has made his selection, the control application 270 then instructs the virtual file system driver 160 to delete the selected virtual disk 155 (step 415).

When the virtual file system driver 160 receives the command for deleting a virtual disk 155, the control command handler 163 deletes a link to the device object for the selected virtual disk (step 420). Preferably, this is performed using the IoDeleteSymbolicLink( ) service routine. In this way the drive letter assigned to the virtual disk is made available again and can be assigned to other devices. For example, an icon for the virtual disk will disappear from the Windows Explorer within the "My Computer" portion of the Windows shell namespace.

Next, the control command handler 163 deletes the device object representing the virtual file system mounted on the virtual disk (step 425). Preferably, this is performed using the IoDeleteDevice( ) service routine. Next, the control command handler 163 deletes the device object representing the virtual disk 155 (step 430). Preferably, this is also performed using the IoDeleteDevice( ) service routine. After the device object representing the virtual disk 155 has been deleted, the control command handler 163 deletes the pointers to the device objects representing the virtual disk 155 and virtual file system from the list of available virtual disks 155 (step 435). At this point, the delete process is complete (step 455).

If the virtual file system of the selected virtual disk has virtual files in an open state (step 440), then the deletion is preferably delayed to handle the situation. First, the control command handler 163 preferably removes the device objects representing the selected virtual disk 155 and its corresponding virtual file system from the list of available virtual disks and inserts them into list of delete-pending virtual disks (step 445). The control command handler 163 preferably also sets a flag in the virtual file system device extension which prevents any new open requests from being handled for the virtual file system. The control command handler 163 then creates a system thread that permanently checks if there still are opened virtual files or virtual folders on the selected virtual disk (step 450). As soon as number of the opened virtual files and virtual folders drops to zero the control command handler 163 completes the delete operation (step 420).

Mounting Virtual File Systems

Figure 5:
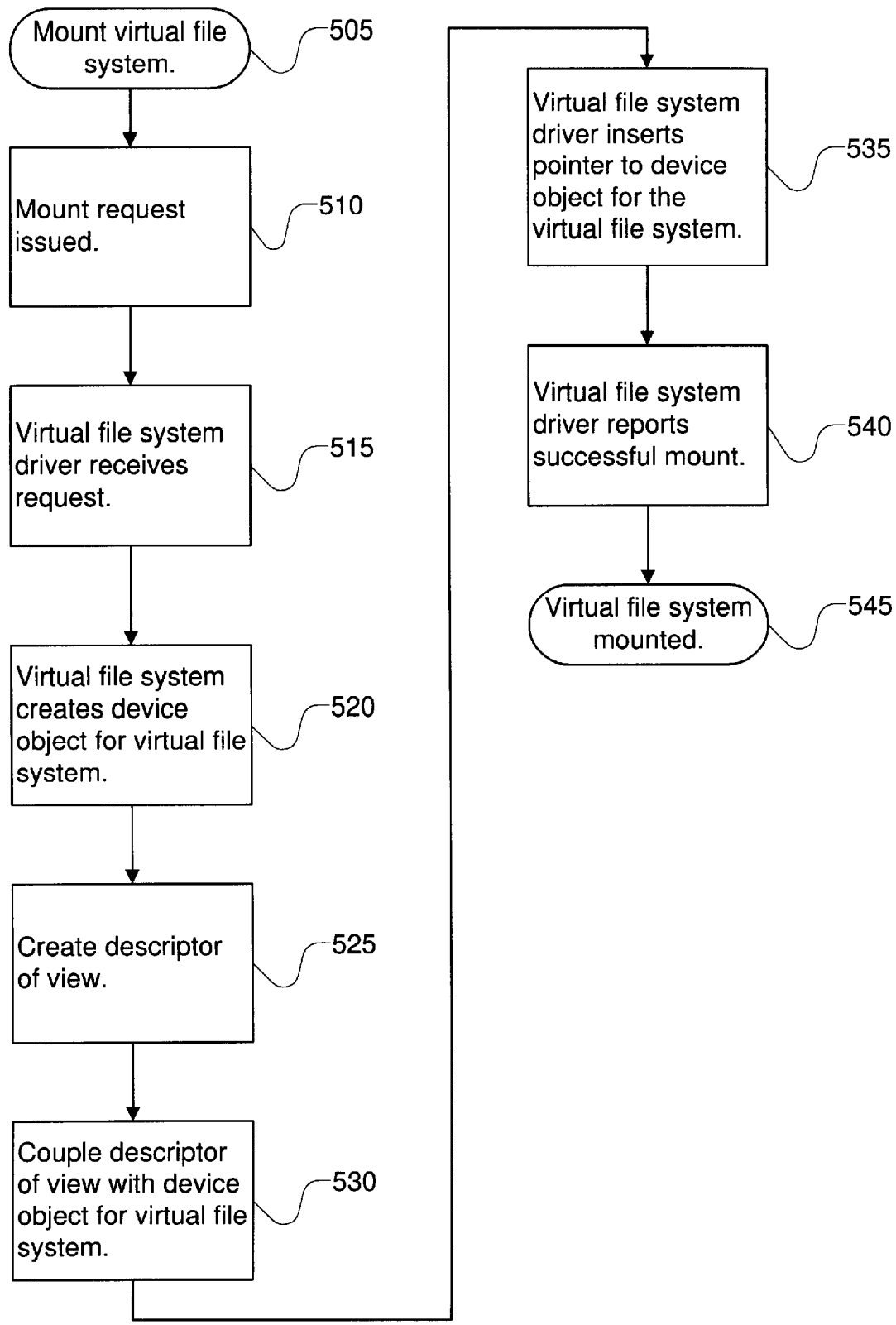
FIG. 5 is a flow chart of a process for mounting a virtual file system in accordance with the invention.

After a virtual disk 155 has been created, an instance of the virtual file system associated with the virtual disk 155 must be mounted on the newly created virtual disk in order for the virtual file system to become accessible to the operating system 130. The process of mounting is explained with reference to FIG. 5.

The process (step 505) starts for almost any operating system when a mount request is issued (step 510). In some operating systems, the mounting of a file system can be initiated by a user. In Windows NT, the mounting process starts when the I/O manager 133 has a file system I/O request to send to a logical disk (which might be either a native disk or a virtual disks). Prior to issuing the I/O request, the I/O manager 133 will determine whether the file system of the indicated logical disk has been mounted. If not, then the logical disk is mounted by the corresponding file system driver. One of the parameters of the I/O manager's request is a pointer on the VPB (Volume Parameter Block) belonging to the target logical disk.

When the I/O manager's mount request reaches the file system recognizer 162, the file system recognizer 162 recognizes that requested logical disk is a virtual disk (step 515). Next, the file system recognizer 162 invokes the IoCreateDevice service routine to create a device object of type FILE_DEVICE_DISK_FILE_SYSTEM that represents the virtual file system mounted on the virtual disk 155 (step 520).

Next, the file system recognizer 162 creates a descriptor of a view destined to be mapped on the virtual disk 155 (step 525). Preferably, this view is obtained from the data repository system 210 and includes the repository containers and items which will correspond to the virtual folders and files in the virtual file system. However, the view could be representative of all or a portion of a native file system.

The file system recognizer 162 then couples the descriptor of the view with the device object representing the virtual file system (step 530). Next, the file system recognizer 162 inserts a pointer to the virtual file system device object into the DeviceObject field of the volume parameter block (VPB) and into the list of available virtual disks (step 535). Lastly, the file system recognizer 162 reports to the I/O manager 133 about successful completion of the mount request (step 540). Thus, the mount is complete (step 545) and the I/O manager 133 can proceeds with the original I/O request.

File Access Services

Most requests for file access services are essentially handled by passing the request to the native file system. This general process is described with respect to opening a file, although the procedure is easily translated to other I/O requests. After this process is described, the processes for exceptional types of file access services are described. For these exceptional I/O requests, the native file system driver 140 is either not used or co-processes with the virtual file system driver 160. The exceptional I/O requests include file close, file cleanup, query file information, set file information, file system control, and directory control.

Figure 6:
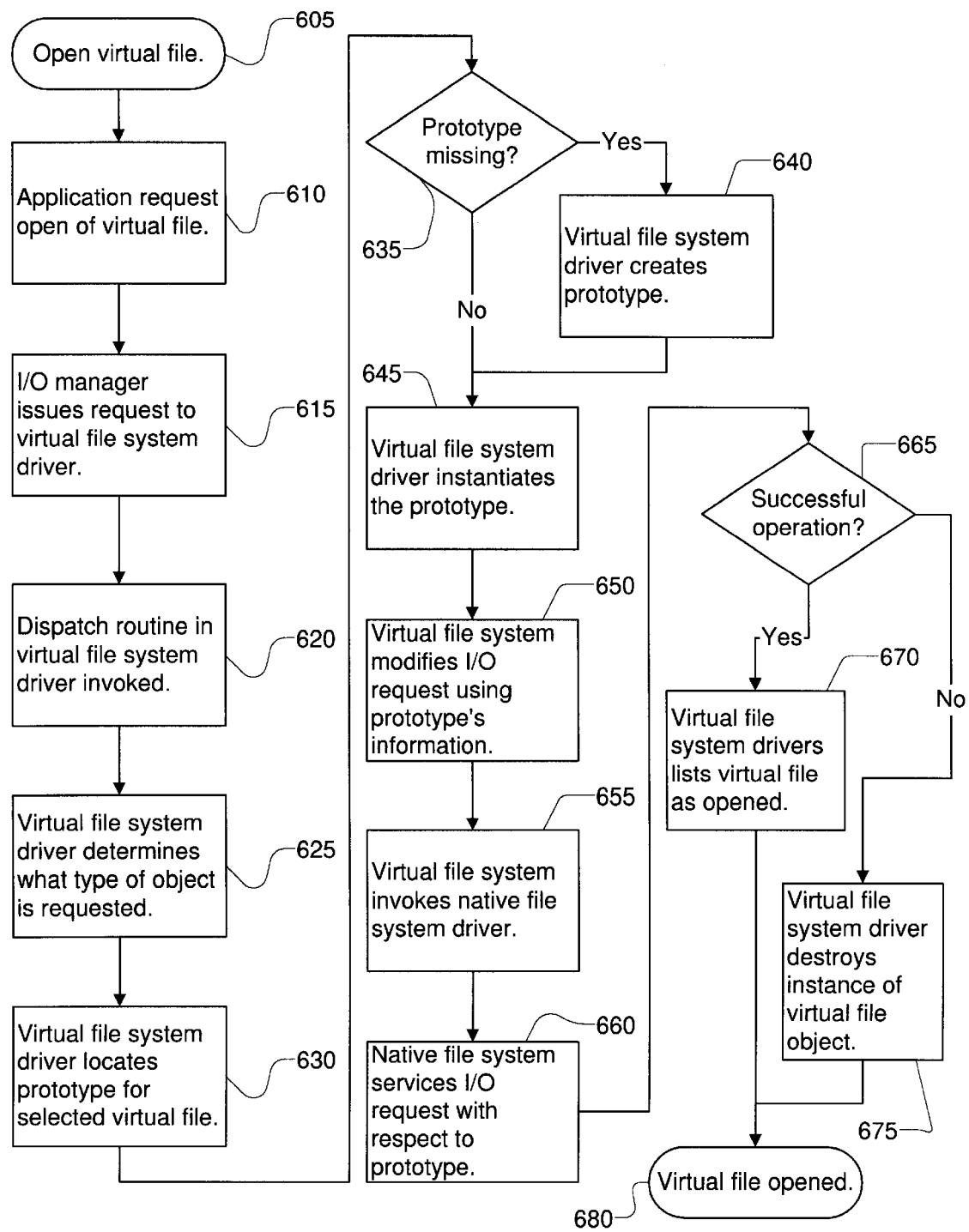
FIG. 6 is a flow chart of a process for handling an I/O request such as file open with respect to a virtual file in accordance with the invention.

Referring now to FIG. 6, the process for opening a file is described. The process begins at step 605. When an application request that a virtual file be opened (step 610), the I/O manager 133 issues an IRP_MJ_CREATE request with appropriate parameters to the virtual file system driver 160 which serves the virtual disk 155 having the requested virtual file (step 615).

The IRP_MJ_CREATE request then goes to the request dispatcher 161. The request dispatcher 161 in turn invokes an appropriate dispatch routine that appears as a component of the virtual file system 164 (step 620). The dispatch routine for the purposes of this example will be referred to as the "Create dispatch routine." The Create dispatch routine then determines whether a virtual volume or a virtual file is the target of the request (step 625). In the disclosed embodiment, the Create dispatch routine checks a FileName field in the appropriate file object structure. If the FileName field has zero length, a virtual volume is the target of the request. Otherwise, a virtual file is the target of the request, and the FileName field comprises a pathname, wherein the last path element of the pathname is the name of the requested virtual file.

If a virtual file is the target of the request, the next step is to determine the location of a prototype for virtual file (step 630). If a data repository system contains an item or container that can be retrieved as a prototype for virtual file or folder, the Create dispatch routine invokes the virtual repository manager 166 and passes the pathname to it. The virtual repository manager 166 then finds a repository container or item appropriate to the given virtual file. The virtual repository manager 166 then determines the location of the prototype of the virtual file on the indicated native disk.

The virtual repository manager 166 tests if the prototype is missing on the native disk drive (step 635). If the prototype is missing, then the virtual file system driver 160 issues commands to create the prototype (step 640). In particular, the virtual repository manager 166 sends a command message to the control application 270 for creating an appropriate prototype file on the native disk.

Once the prototype file has been found or created on the native disk, the virtual repository manager 166 creates an instance of the file object extension that represents the requested virtual file (step 645). Preferably, the virtual repository manager 166 fills the instance of the file object extension with the path to the prototype and supplies the caller (i.e. the Create dispatch routine) with a pointer to the instance of the file object extension. The Create dispatch routine then fills the instance of the file object extension with the pointer to the file object. Next, the Create dispatch routine invokes the virtual file supervisor 168 and passes to it the completed instance of the file object extension.

The virtual file system driver 160 then changes the I/O request from the I/O manager 133, to make it possible for a native file system driver to successfully handle the request. To do this, the virtual file supervisor 168 overrides the values of the DeviceObject and FileName fields of the file object structure created by the I/O manager 133. More particularly, the virtual file supervisor 168 inserts into the DeviceObject field the pointer to the device object representing the native disk which stores the prototype, and the virtual file supervisor 168 inserts into the FileName field the path to the prototype.

Next, the Create dispatch routine invokes the native file system driver 140 which services the native file system having the prototype, and passes to that native file system driver 140 the transformed I/O request (step 655). The native file system driver 140 then services the transformed I/O request (step 660).

When the native file system driver 140 completes the given I/O request, the Create dispatch routine checks whether the I/O request has been completed with success (step 665). If the I/O request has been completed with success, the Create dispatch routine inserts a pointer to the instance of the file object extension into the list of opened virtual files and returns to the I/O manager 133 (step 670). Otherwise, the Create dispatch routine destroys the instance of the file object extension and returns the error to the I/O manager 133 (step 675). In either case, the process is complete (step 680).

In sum, when the virtual file system driver 160 receives an I/O request directed to a virtual file, the virtual file system driver 160 employs the native file system driver 140 to handle that request on a native file which is a prototype of virtual file. As a result, subsequent I/O requests pertaining to the virtual file will be issued directly to the native file system driver and the native file system driver services the I/O requests with its own routines.

As mentioned, there are a number of I/O requests which have special handling. These exceptional I/O requests are detected by the prototype file filter 167. If the intercepted I/O request pertains to a native file that appears as a prototype of a virtual file, then the prototype file filter 167 checks whether the request matches one of the exceptional I/O request types. If so, the prototype file filter 167 calls an appropriate routine of the virtual file supervisor 168.

One of the exceptional I/O requests is file close. Upon intercepting an IRP_MJ_CLOSE request, the prototype file filter 167 invokes the virtual file supervisor 168 and passes to it the intercepted request. The virtual file supervisor 168 determines the targeted virtual file and deletes the corresponding file object extension from the list of open virtual files. Then virtual file supervisor 168 destroys the file object extension created as applied to the target virtual file.

Another of the exceptional I/O requests is file cleanup. Upon intercepting an IRP_MJ_CLEANUP request, the prototype file filter 167 invokes the virtual file supervisor 168 and passes to it the intercepted request. The IRP_MJ_CLEANUP requests are exceptional because they may require deletion of a virtual file from the virtual disk 155. In order to handle an IRP_MJ_CLEANUP request the virtual file supervisor 168 passes the request to the native file system, and if it succeeds then the virtual file supervisor 168 checks the Flags field in the file object structure representing the target file. If the current value of the Flags field is relevant to the file deletion, then the virtual file supervisor 168 notifies the virtual repository manager that the given virtual file has been deleted.

Another of the exceptional I/O requests is query file information. Upon intercepting an IRP_MJ_QUERY_INFORMATION request, the prototype file filter 167 invokes the virtual file supervisor 168 and passes to it the intercepted request. The IRP_MJ_QUERY_INFORMATION requests are exceptional because there are two types of the request: FileNameInformation and AlternateFileNameInformation that must be completed by the virtual file system driver 160. If the query file information request is of the FileNameInformation type, then the virtual file system driver 160 provides to the requester the full pathname to the target virtual file. If the query file information request is of the AlternateFileNameInformation type, then the virtual file system driver 160 provides to the requester the short (alias) name of the given virtual file. In either case, the requested information concerns the virtual file, not the prototype file, so the virtual file system driver 160 has to complete the request without invoking the native file system driver 140.

Another of the exceptional I/O requests is set file information. Upon intercepting an IRP_MJ_SET_INFORMATION request, the prototype file filter 167 invokes the virtual file supervisor 168 and passes to it the intercepted request. The IRP_MJ_SET_INFORMATION requests are exceptional because they may require renaming of a virtual file. In order to handle an IRP_MJ_SET_INFORMATION request the virtual file supervisor 168 passes the request to the native file system 164. If the native file system 164 succeeds in renaming the virtual file, then the virtual file supervisor 168 notifies the virtual repository manager 166 that the given virtual file has been renamed.

Folder Services

As with other virtual files, when the virtual file system driver 160 receives most types of I/O requests directed to virtual folders, the virtual file system driver 160 employs the native file system driver 140 to handle those requests on native folders which are the prototypes of the targeted virtual folders. However, with respect to virtual folders, there are a number of I/O requests which also have special handling.

Only one of these exceptional virtual folder I/O requests is discussed here—that for directory control. Upon intercepting the IRP_MJ_DIRECTORY_CONTROL request, the prototype file filter 167 invokes the virtual file supervisor 168 and passes to it the intercepted request. The virtual file supervisor 168 checks whether the request is a request to obtain the contents of a virtual folder. In particular, the virtual file supervisor 168 checks the minor code of the request, and if the value of the code is not equal to the IRP_MN_QUERY_DIRECTORY, then the virtual file supervisor 168 completes the request with an error. Otherwise, the request is treated as a request to obtain the contents of a virtual folder and the virtual file supervisor 168 services the request.

Before servicing the request, the virtual file supervisor 168 checks whether the request is the first request to obtain the contents of the specified virtual folder. If the request is the first such request, then the virtual file supervisor 168 saves the search pattern supplied by the caller. Then the virtual file supervisor 168 calls the virtual repository manager 166 to search the list of virtual folders for a match, and the virtual repository manager 166 passes back the pathname of the matching virtual folder.

Given the pathname of the virtual folder, the virtual repository manager 166 creates the command message for obtaining the contents of the container that resides in the data repository system 210 and is represented on the virtual disk 155 as the specified virtual folder. Then the virtual repository manager 166 sets the event object that signals the control application 270 that a command message has been issued. After the event object has been set, the virtual repository manager 166 waits to receive the contents of the specified repository container.

After the control application 270 fetches the command message and delivers the contents of the specified repository container, the repository manager 166 services the request for obtaining the contents of the specified virtual folder. In particular, the virtual repository manager 166 determines the folder entries that match the search pattern and creates a list of folder entries that match the search pattern (hereafter referred to as a secondary list of matched folder entries). After the secondary list has been created, the virtual repository manager 166 invokes the folder enumeration facilities of the native file system 140 to determine the entries that belong to the prototype folder and match the search pattern.

As a result of using these enumeration facilities the virtual repository manager 166 creates yet another list of folder entries that match the search pattern (hereafter referred to as a primary list of folder matched entries). Once both of the lists of matched folder entries have been created, the virtual repository manager 166 creates a conjunct list of matched folder entries covering both the primary and secondary lists of matched folder entries. Then, the virtual repository manager 166 returns the conjunct list of matched folder entries to the virtual file supervisor 168.

Upon receiving the conjunct list of the matched folder entries, the virtual file supervisor 168 preferably includes in the conjunct list an entry for DESKTOP.INI file that enables using of the view application 220. Thus, the virtual file supervisor 168 causes the browser application 230 (that appears as the standard shell of the operating system 130) to be switched from using its inherited view component to using the view component contained in the view application 220. Then the virtual file supervisor 168 saves the conjunct list for further use in subsequent requests. Once the conjunct list has been created and saved, further handling of the request is considered within the skill of one of ordinary skill in the art.

Thus, by creating and using the conjunct list of matched folder entries, the virtual file supervisor 168 maps to the virtual disk both the files that can be retrieved from the data repository system 210 as well as the files that reside on the native disk.

The View Application

Referring again to FIG. 2, the view application 220 will be described. The view application 220 represents a custom view of the folders and files that reside on the virtual disk 155. The view application 220 appears as a user mode 240 application that is joined with the browser application 230.

According to one aspect of the invention, the view application 220 represents virtual files and virtual folders and their attributes. The view application 220 has access to both the native file system 133 and the data repository system 210. As a result of this, the view application 220 can represent both a set of conventional file attributes provided by the native file system 133 and a set of additional file attributes provided by the data repository system 210. In particular, the view application 220 is capable of representing one or more attributes that files extracted from the data repository system 210 inherit. Additionally, the view application 220 is capable of representing one or more calculated attributes that derive from a comparison operation which takes as inputs the file that serves as a prototype of a virtual file and an item that can be retrieved from the data repository as the prototype file.

The view application 220 preferably is not limited to representing virtual files and virtual folders. Rather, the view application 220 preferably can be used to represent other objects. These objects need not be files or data associated with files. However, the view application 220 permits these objects to be viewed and handled by the user as if they were files, folders and other objects which are included in the native file system.

Figure 7:
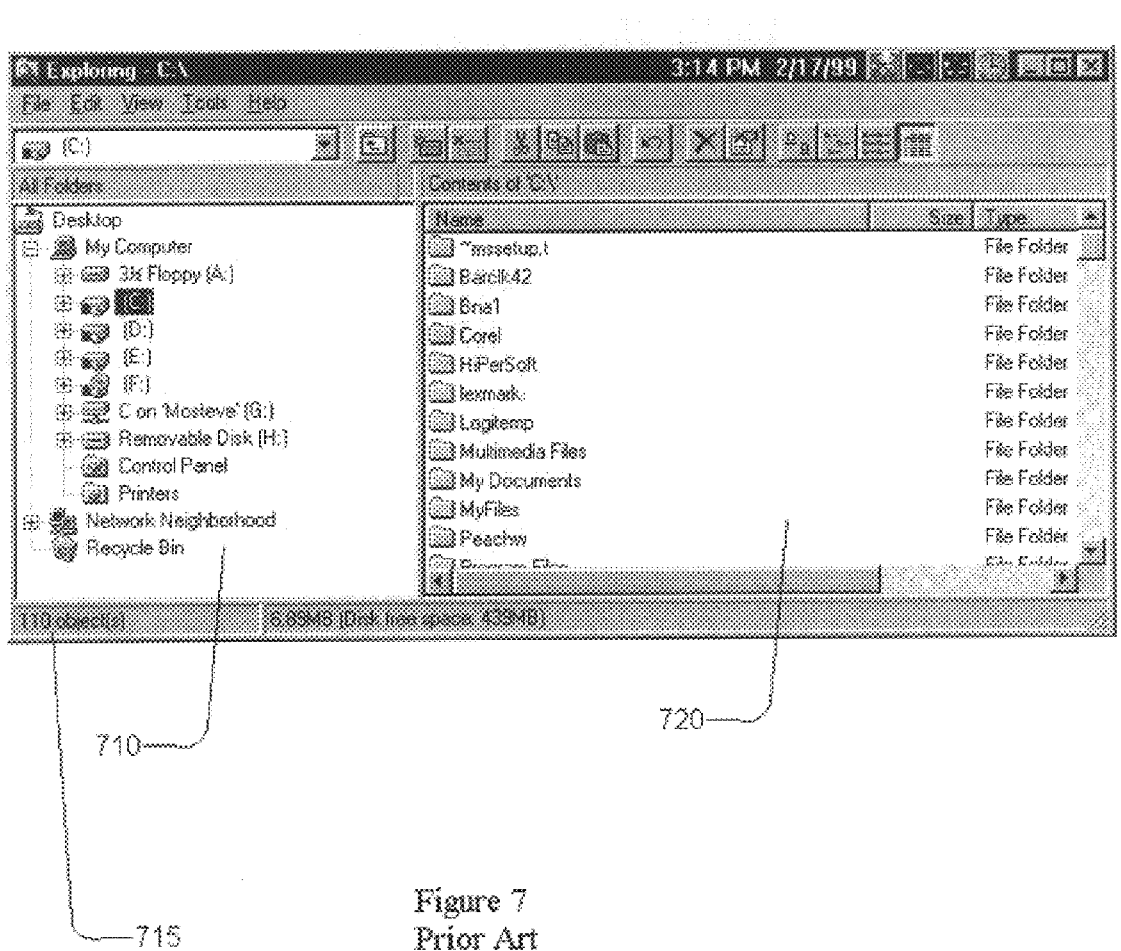
FIG. 7 is a screen shot of a prior art default view of a file system using Windows Explorer.
Figure 8:
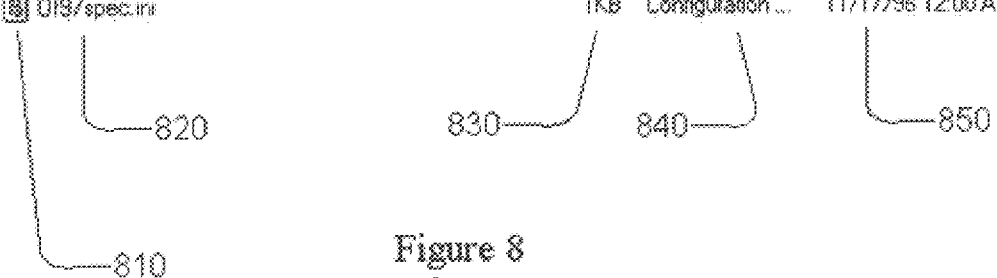
FIG. 8 is a partial screen shot of a prior art default view of a file system using Windows Explorer.

In the disclosed embodiment, the browser application 230 is the Windows Explorer, which appears as the shell of the operating system 130. A view of a native file system using Windows Explorer is shown in the screen shot of FIG. 7. The browser application 230 includes a left pane 710 and a right pane 720. The browser application 230 further includes a display 715 of the number of objects in the right pane 720. FIG. 8 shows a view of a portion of a native file system using the browser application 230. The view of FIG. 8 includes, for each native file, an icon 810, a file name 820, a file size 830, a file type 840 and a file time stamp 850. Those of ordinary skill in the art are well acquainted with the Windows Explorer and similar browser applications and so further discussion is not made of the details of the operation of the browser application 230.

Figure 9:
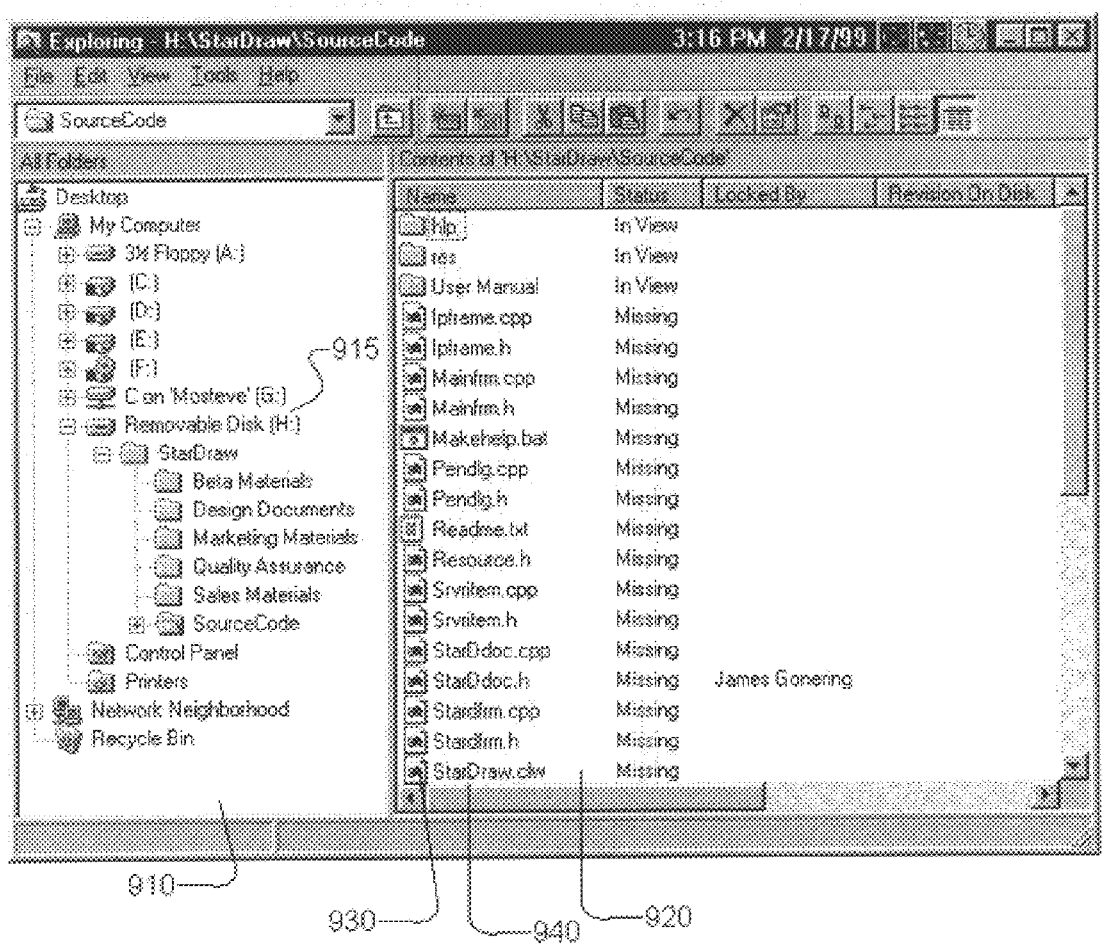
FIG. 9 is a screen shot of a custom view of a virtual file system in accordance with the invention.

FIG. 9 shows a virtual drive in the left pane 910 as logical drive H: (reference 915). The right pane 920 shows icons 930 and names 940 for the virtual files and virtual folders in the virtual drive, in a manner like that of FIG. 7.

The view application 220 appears as a substitute of the default view component of the shell that represents native in the right pane 720. The view application 220 is preferably implemented as an in-process server DLL employing the apartment threading model. The view application 220 preferably exports the standard set of in-process server DLL functions including the DllMain, DllGetClassObject and DllCanUnloadNow functions. The DllMain, DllGetClassObject and DllCanUnloadNow functions are the same as they would be for any in-process server DLL in OLE.

Figure 11:
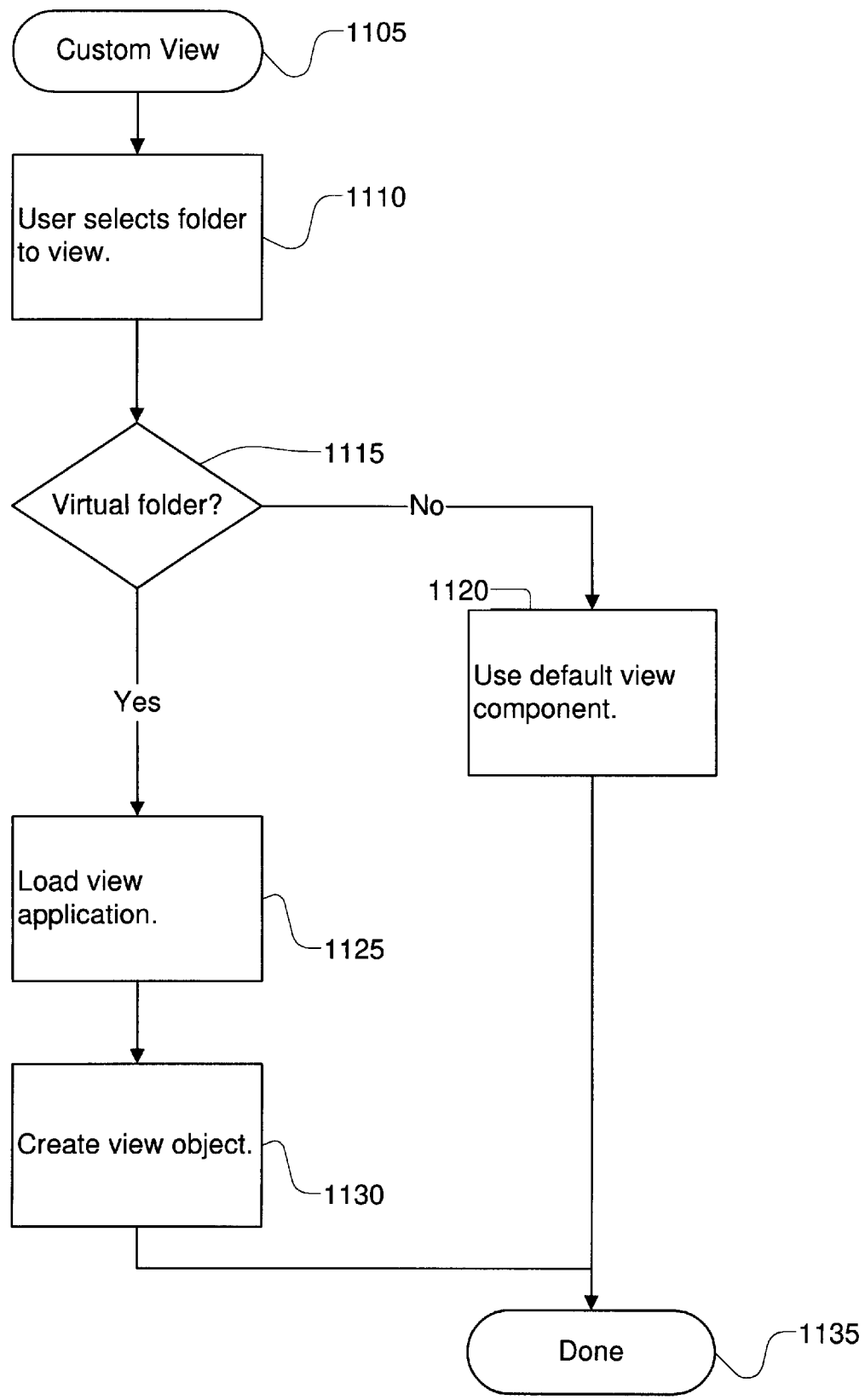
FIG. 11 is a flow chart of providing custom views in accordance with the invention.

Referring now to FIG. 11, the method of providing custom view in accordance with the invention is described. After the method begins (step 1105), the user selects a folder from the browser application 230 to view (step 1110). The type of folder is then tested (step 1115). If the selected folder is a native folder, then the default view component of the browser application 230 is used (step 1120).

In support of this test (step 1115), the virtual file system driver 160 preferably includes in each virtual folder a virtual file named DESKTOP.INI. The DESKTOP.INI preferably stores a user interface class identifier (UICLSID) of the view application 220. When the browser application 230 is requested to obtain a view of a selected virtual folder, instructions in the DESKTOP.INI instruct that the view application 220 be utilized instead of the default view component of the browser application 230.

Thus, if the folder is a virtual folder, the view application 220 is loaded (step 1125). The view application 220 implements an object that exposes the IClassFactory interface for creating a view object, through which the operating system 130 provides a custom view of the virtual files of the selected virtual folder (step 1130). Once either the view application or the default view component has provided the requested view, the method is complete (step 1135).

FIG. 10 shows a view of a portion of a virtual file system using the browser application 230 and the view application 220 of the invention. The custom view provides list of file attributes including both conventional and additional attributes of virtual files. The view application 220 preferably obtains conventional attributes, such as file name 1010, size 120 and type 1030 using standard file functions provided by the operating system 130.

The view application 220 preferably can obtain additional attributes of virtual files from the data repository system 210. For example, the view application 220 preferably can obtain and provide as a file attribute the status 1040 of the virtual file. The status of a virtual file preferably indicates the relationship between a file that currently serves as a prototype of the virtual file, on the one hand, and the tip (most resent) revision of the same file that can be retrieved from the data repository system 210, on the other hand. In the disclosed embodiment, the status of a virtual file may have one of the following values:

Missing—The prototype file is not present on the native disk 150, but in the data repository system 210 there is one or more revisions of the file (that can be retrieved from the data repository system 210) to serve as the prototype for virtual file;

Current—The prototype file is present on the native disk and the tip (latest) revision of the file (that can be retrieved from the data repository system 210 to serve as the prototype for virtual file) are identical;

Modified—The prototype file is present on the native disk has been altered and is based on the tip (latest) revision of this file;

Merge—The prototype file is present on the native disk has been altered but is not based on the tip (latest revision) of this file;

Out of date—The prototype file is present on native disk is a copy of an old revision of the file;

Not in view—The file is present on the native disk, but it is not under version control. In other words, in the data repository system 210 there is not any retrievable revision of the file.

Once the conventional and additional attributes of virtual folders and files are retrieved or/and calculated, further implementing the view application 220 containing a view object that exposes the IShellView interface is considered within the skill of one of ordinary skill in the art.

Other attributes shown in FIG. 10 include whether the virtual file is locked, and if so, then by who 1050, and the revision number 1060 of the virtual file.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

APPENDIX

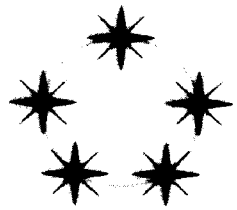

Table of Contents

Chapter 1:
Installing StarDisk .................................................... 1
    StarDisk System Requirements, Specifications, and Compatibility .......... 1
    Installing StarDisk ............................................... 3
    Starting StarDisk ................................................ 3
    Exiting StarDisk. ................................................ 4
    StarDisk Requires the StarTeam Environment Variable ................... 4
    Caveats! ....................................................... 6
    Conventions .................................................... 6

Chapter 2:
Using StarDisk ........................................................ 9
    Using Version Control without the Version Control Application ........... 9
    Retrieving Files for a Build ....................................... 13
    Creating a Reference Folder of Files ................................ 14
    Mapping Views on Virtual Drives .................................. 14
    Configuring the View ........................................... 16
    Selecting a Working Folder for the View's Root Folder .................. 19
    Setting View Preferences ......................................... 22
    Configuring the Workspace ....................................... 26
    Using Virtual Drives ............................................ 29
    Understanding and Updated File Statuses ............................ 30
    Changing the Color Scheme for Statuses ............................ 34
    Sorting the Data about Files ...................................... 35
    Adding Files to the View ......................................... 36
    Checking Files In ............................................... 37
    Checking Files Out ............................................. 40
    Locking and Unlocking Files ...................................... 45
    Comparing File Revisions ........................................ 47
    Reviewing Properties ............................................ 48

Disabling the Extension to Windows Explorer ........................... 51
Deleting the Mapping................................................ 51
Refreshing Virtual Drives ........................................... 52
Exiting StarDisk................................................... 53

Index......................................................... 55

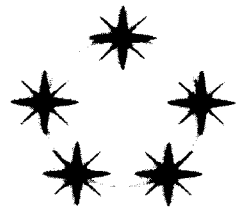

Chapter 1:
Installing StarDisk

StarTeam's StarDisk is a virtual file system that allows you to use conventional Windows applications, such as Windows Explorer, Microsoft Word for Windows, and Microsoft Developer Studio, to access and manage files that are under version control. You use StarDisk to map a StarTeam view to a virtual drive. Then you can access any file on that drive from Explorer or another application, even though you don't have this file checked out.

This chapter explains StarDisk's system requirements and provides installation instructions.

StarDisk System Requirements, Specifications, and Compatibility

StarDisk is a companion to, and not a replacement for StarTeam. Before you install StarDisk, you must install StarTeam on your workstation. Access to any StarTeam VirtualTeam Servers must be configured from StarTeam. StarDisk also uses other StarTeam data.

| | |
|---|---|
| Operating Systems | Windows 95 OSR2, Windows 98, Windows NT Workstation 4.0 with Service Pack 3.0 or higher, and Windows NT Server version 4.0 with Service Pack 3. |
| Memory, Storage and Hardware Requirements | 1 MB of disk space for Windows 95 or Windows NT |
| | An IBM or 100% compatible computer with a Pentium processor |
| | Access to a CD-ROM drive for installation purposes |
| | VGA or higher resolution monitor |
| | A mouse or other compatible pointing device |
| Supported Protocols | StarDisk only supports the TCP/IP (sockets) protocol. StarTeam VirtualTeam Server must provide sockets and StarTeam must be configured to access that server using sockets. |
| | If StarTeam lists a server that StarDisk doesn't, StarTeam is probably accessing that server via NetBIOS/NetBEUI, TCP/IP (RPC), Named Pipes, Light-weight RPC or IPX/SPX (the other protocols supported by StarTeam VirtualTeam Server). To allow StarDisk to access that server, you can change the protocol, or more conveniently, you can create another server description in StarTeam for the same server but with TCP/IP (sockets) as its protocol. Then the server can be accessed from StarTeam using either protocol and from StarDisk using TCP/IP (sockets). |

StarDisk uses all the settings specified for StarTeam. For example, if StarTeam encrypts data transferred to or from the server, so does StarDisk.

Installing StarDisk

You must install StarTeam on your workstation prior to installing StarDisk. You must also set up accesses to any StarTeam VirtualTeam Servers from StarTeam. The StarDisk version number must match the StarTeam version number.

To install StarDisk:

1. Close all other Windows applications.

2. Insert the StarTeam compact disc into your CD-ROM drive.

3. Select Start ⇨ Run....

4. Type:

```
   x:\setup.exe
   ``` where x: is the drive letter of your CD-ROM drive.

Then press Enter.

5. Click Install StarDisk.

6. Follow the installation instructions on the screen.

Starting StarDisk

StarDisk starts automatically when you start Windows and places the StarDisk icon  in your system tray. However, you can disable this feature.

To stop StarDisk from starting automatically:

1. Double-click the StarDisk icon .

The StarDisk View Browser dialog opens.

2. Click Disable StarDisk.

Now you must start StarDisk manually, for example using the Start menu (Start ⇨ Programs ⇨ StarTeam 4.0 ⇨ StarDisk) until some time at which you re-enable StarDisk.

Exiting StarDisk

To exit StarDisk:

1. Delete any mapping.

2. Do one of the following:
   - From the StarDisk View Browser dialog, click Exit StarDisk.
   - Right-click the StarDisk icon  to display the pop-up menu. Click Exit.

StarDisk Requires the StarTeam Environment Variable

StarDisk is a product that StarTeam users may prefer because it uses Windows Explorer instead of the StarTeam main window to represent and manage files under version control. StarDisk provides a simplified interface for users who are already familiar with Windows Explorer and who only need to work with a few files.

StarDisk uses the StarTeam environment variable to locate StarTeam.ini, which contains workstation options and the location of alternate working folders. This variable is automatically set for the logged-on user when StarTeam is installed on a workstation. However, if other users access that workstation, they must create the environment variable using the Control Panel.

To create the environment variables from the Control Panel:

1. Log on to the workstation as the user.

2. Open the Control Panel by select Start ⇨ Settings ⇨ Control Panel.

3. From the Control Panel window, select System.

4. From the System Properties dialog, select the Environment tab.

5. Check the list box that displays User Variables.

6. If there is no StarTeam variable, type StarTeam in the Variable text box.

7. It's value should be the path to the StarTeam.ini file in the folder where StarTeam has been installed. This path is usually C:\Program Files\StarTeam 4.0\StarTeam.ini.

8. Reboot the computer so that the environment variable becomes part of the current environment.

If the StarTeam.ini file is missing, StarDisk uses the default settings for the workstation options and assumes that there are no alternate working folders. The next time you use StarTeam, StarTeam automatically recreates the StarTeam.ini file without consulting you. The recreated file contains only the default settings for the workstation options and no alternate working folder information. If it is corrupted, you can delete it, but it might be possible to edit it using the "Appendix C: Understanding Environment Variables and INI Files" in the *StarTeam Administrator's Guide*. Better yet, back up StarTeam.ini or put it under version control. You can tell that the StarTeam.ini file is missing or corrupted when:

- Your workstation options are no longer correct
- Changes you made to workstation options disappear when you restart StarTeam
- Files don't change even though you have checked them out (really they have been copied to the wrong working folders)
- StarTeam says that old files are missing and does not see new files (really StarTeam is looking for them in the wrong place)

StarDisk also uses the sdnsent.ini which is installed with StarDisk. If it is missing or corrupted, StarDisk runs, but without the extension to Windows Explorer that displays StarTeam's file information, such as status, in the Explorer window. You can reinstall StarDisk to replace or correct this file. You can also create it yourself as each sdnsent.ini contains the following two lines verbatim.

```
[.ShellClassInfo]
UICLSID={740B6D30-653B-11d2-B2EB-00C04F96475A}
```

The above information is duplicated as the desktop.ini file that appears in each virtual folder that represents a folder in the mapped view. This file allows Windows Explorer to be extended to show file statuses and other information from StarTeam about each file.

The desktop.ini file is not visible from Windows Explorer, but it can be seen at the command line, for example, if you perform dir *.* . StarDisk creates desktop.ini when the extension is enabled and deletes it when the extension is disabled. If you are using StarDisk to build an application, you will probably want to disable the extension to Windows Explorer so that the file will not be in the folder when the build takes place.

Caveats!

In Windows 95 and 98, you cannot run StarDisk on the same workstation as the StarTeam VirtualTeam Server that StarDisk is using. This will eventually cause StarDisk to hang.

Conventions

| Convention | Description |
| --- | --- |
| Select File ⇨ Exit | Menu selections look like this. The arrow ( ⇨ ) indicates a drop-down menu selection. In this case, select File from the menu bar, then select Exit from the drop-down menu. |

☆ NOTE     Note indicates important or supplemental information.

○━ TIP     Tip indicates suggestions that may be helpful.

Fixed-Space Type   Information that you need to type and messages from the system are printed in fixed-space type.

Chapter 1: Installing StarDisk

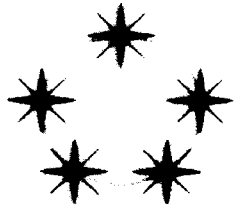

Chapter 2:
Using StarDisk

StarDisk allows you to use conventional Windows applications to access and manage files that are under version control. You use StarDisk to map a StarTeam view to a virtual drive. Then you can access any file on that drive from Explorer or another application, even though you don't have this file checked out.

This chapter suggests some uses for StarDisk and explains both how to map the virtual drive and use the folders and files that you have mapped.

Using Version Control without the Version Control Application

StarDisk allows you to perform version control operations, such as checking files in and out, without involving StarTeam. This allows you to work on one or more documents that are under version control, while minimizing the need to learn a new application and its features.

To use version control in a simple, familiar environment:

1. Map a StarTeam view onto a virtual drive.

2. Use StarDisk's additions to Explorer's pop-up menu to check files in and out, lock them, review their histories, etc.

To help you manage these files in Windows Explorer, StarDisk:

- Adds columns of information from StarTeam to the right pane. Specifically, the right pane displays the file status, the name of anyone who has exclusively locked the file, and the revision number for the revision on your workstation.

These columns are in addition to the usual size, type, modified time, and attributes list provided by Windows Explorer.

The following figure shows these additional columns for the StarDraw project view which has been mapped to drive E:\. Each row is color-coded based on the status of the file represented by that row. For example, the information about modified files is in red while the information about out-of-date files is in green.

- Extends Explorer's pop-up menu by adding the StarDisk submenu. This menu, varies, depending on whether you have selected the virtual drive's root folder, a folder, or a file. For example, the file commands allow you to lock, unlock, check in, and check out files on the virtual drive.

The following figure shows the pop-up menu for the root folder for the virtual drive.

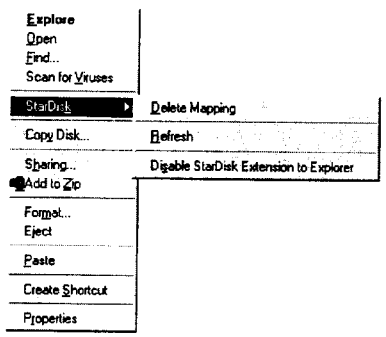

The next figure shows just the StarDisk submenu for folders and files.

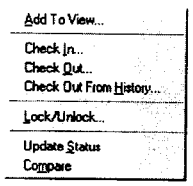

- Allows you to review and manage a virtual drive's properties (and that of its folder and files) using Explorer's Properties dialog.

The following figure shows the StarDisk properties dialog for a file. The properties are different for virtual drive's root folder, folders that are in the StarTeam view, folders that are not in the StarTeam view, and for files.

Chapter 2: Using StarDisk

For example, you can check out earlier versions of a file using the History list box's pop-up menu.
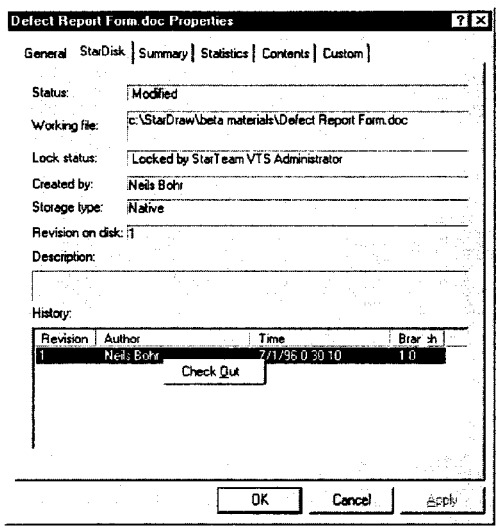
StarDisk User's Guide

Retrieving Files for a Build

You can use StarDisk to retrieve a set of files that are under version control. For example, if you work on building project images, using StarDisk can ensure that you check out only the files used in the build and no others. Once the virtual disk has been created, use it as a source of the needed files.

To do a build with StarDisk:

1. Map the StarTeam view, selecting the options that meet your current information needs. See "Mapping Views on Virtual Drives" on page 14 for details.

 NOTES (Recommended.) If you plan to perform a build on the virtual drive, use the working folder hierarchy (see "Setting View Preferences" on page 22).

(Recommended.) When performing a build, disable the StarDisk extension to Windows Explorer first so that the desktop.ini file is no longer in each folder. For more information about disabling the extension, see "Disabling the Extension to Windows Explorer" on page 51. For more information about desktop.ini, see "StarDisk Requires the StarTeam Environment Variable" on page 4.

2. Start the build.

Creating a Reference Folder of Files

You can use StarDisk to create a a reference folder accessible via your LAN, filling the folder with files that are under version control. In other words, you can share files that reside on the virtual drive and enable read-only access to them. For example, you can create program utilities that developers need to access.

To create a virtual reference folder:

1. Map the StarTeam view, selecting Read-only from the Preference dialog box of the Disk Profiler. See "Mapping Views on Virtual Drives" on page 14 for details.

Be sure to hide the files that are not in the view.

2. Share the drive.

3. The authorized users of your LAN can map the contents of the virtual drive onto a net drive and use it as a reference folder.

Mapping Views on Virtual Drives

Any view in StarTeam can be mapped to a virtual drive. Simply start StarDisk and select the view and the drive letter.

The StarDisk View Browser dialog provides a tree view of your servers, projects, and project views. Once you map a view, the View Browser dialog also indicates which view is mapped to the designated drive letter.

The next two figures show the View Browser dialog before and after a view is mapped to a drive.
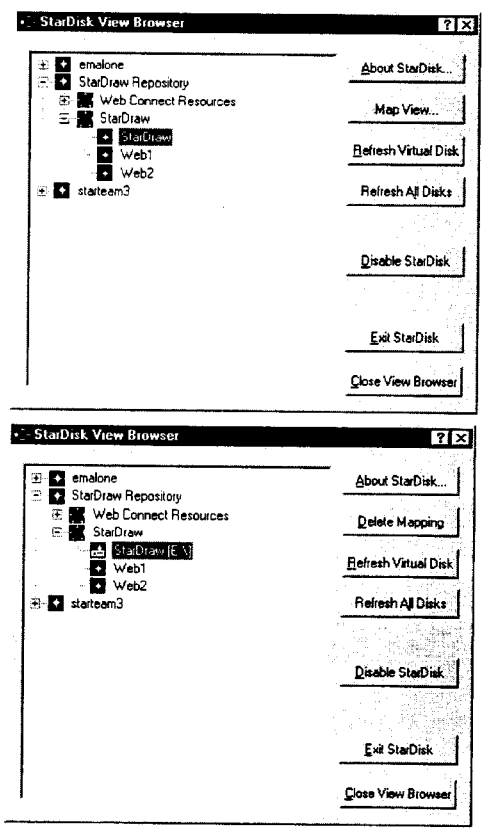

Mapping the view is a process with several steps.

To map views:

1. If StarDisk does not start automatically, start StarDisk. For example, you can select Start ⇨ Programs ⇨ StarTeam 4.0 ⇨ StarDisk from the Start menu.

The StarDisk View Browser opens and the StarDisk View Browser icon  appears on the taskbar.

2. Double-click the StarDisk View Browser icon  (or right-click it and select View Browser... from the pop-up menu).

3. Select the project view you want to map.

(Until you select a view, the Map View button is disabled.)

4. Click Map View.

The StarDisk Profiler: Map View dialog opens and the Configuration tab is selected.

5. Go on to the procedure in the next section, "Configuring the View."

Configuring the View

Each view represents a StarTeam project from a different perspective. A StarTeam project and its root view are created simultaneously. However, additional views are based on the views that preceded it. For example, a view might contain a subset of the StarTeam folder hierarchy found in the project's root view. It may be based on the contents that an earlier view, called its parent view, contained at a particular point in time. Many views begin to differ from their parent views almost immediately as new files, etc. are added to them.

The view you decide to map is one that conveniently displays all the files you need to work on. Usually you will map the view to a virtual drive as it is at this moment in time. This is called the current configuration. However, you can reconfigure the view before you map it to display the files that have a particular label, belong to a particular promotion state, or that existed at a particular time in the past.

Any configuration other than the current configuration becomes read-only as far as the StarTeam VirtualTeam Server is concerned. That doesn't mean that you can't change the files on the virtual drive, but it does mean that you can't check them in.

Because the current configuration is the default, you can skip this entire section unless you want to roll back the view to a past label, state, or time.

To configure the view:

1. From the StarDisk Profiler, select the Configuration tab to configure the view.

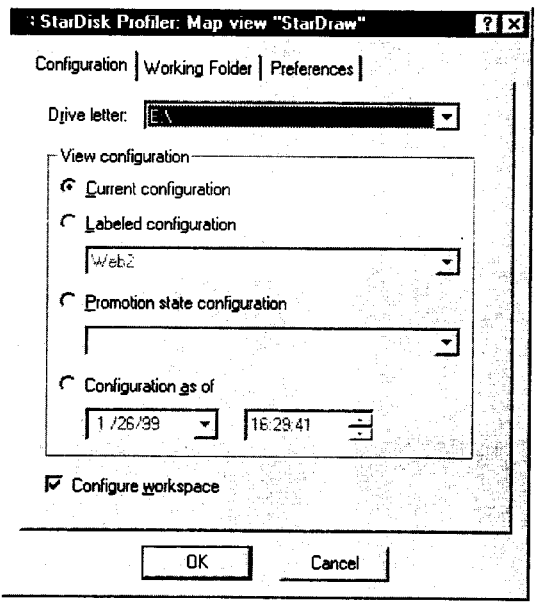

2. Select the drive letter from the drop-down list box.

This will be the drive letter assigned to the mapped view and is displayed to the right of the name of the view in the View Browser's tree hierarchy.

3. Select a view configuration option:
   - Current Configuration

This provides the most current view.
   - Labeled Configuration

This limits the view to items with the label that you select from the drop-down list box.

This option is disabled if this view has no labels defined for it.
   - Promotion State Configuration This limits the view to items with the promotion state that you select from the drop-down list box.

If the promotion state assigned is <current> rather than a view label, this configuration is still read-only.

This option is disabled if this view has no promotion states defined for it.
   - Configuration As Of This rolls back the view to a specific point in time. It includes everything in the view just prior to the date and time you select.

This option defaults to the current date and time, but you can select one in the past—so long as it is after the time at which the view was created.

 NOTE

Be aware that checking out files based on a date and time is different than rolling back a view to that same date and time. When you check out files based on a date and time, you get previous revisions of the current files.

When you roll back a view, you can see the files that existed at the time you specified even though they have since been deleted. Checking out the latest revision of a file in the rolled back view checks out the latest revision known to that configuration (not the latest revision in the current configuration). Thus, rolling back a configuration allows you to check out a file that no longer exists in the current view.

4. (Optional) Select the Configure Workspace check box to review information about the mapped view, including file status statistics and make changes about what files are in the view, displayed, checked out, etc. This allows you to make changes to the data before StarDisk maps the view to the virtual drive.

5. Go on to the procedure in the next section, "Selecting a Working Folder for the View's Root Folder."

Selecting a Working Folder for the View's Root Folder

A working folder is a location on your workstation where StarTeam checks files out to and expects files to be checked in or added to StarTeam. StarDisk also uses working folders. However, it goes one step further; it maps the files in those working folders to a virtual drive.

If you have selected an alternate working folder for StarTeam to use for your view's root folder, StarDisk selects that folder has a default. If you have not specified and selected an alternate working folder, StarDisk selects the working folder specified in StarTeam for all users of this view.

The root folder is the root of the StarTeam folder hierarchy for the view. The location of its working folder usually affects the location of all its child folder's working folders.

For more information about working folders, alternate working folders, and the trickle-down effect that an alternate working folder's location may have on the working folders for other StarTeam folders in the hierarchy, see "Chapter 3: Managing Folders" in the *StarTeam User's Guide*.

If you already have some of this view's files on your workstation in the StarTeam working folder or its alternate, you will probably continue to use that folder.

Be aware that StarDisk only checks for alternate working folders at the root of the view. If you have set up alternate working folders for other folders in the StarTeam folder hierarchy, they are ignored.

The side-effect of this is that StarDisk looks for files in a location that does not exist on your workstation (or at least in a location that is not in use). If the folder does not exist, StarDisk will think that the folder and its files are missing and check them out as needed. (If the folder exists but is not up-to-date, StarDisk will recognize that the files are out-of-date.) If you checked in any modified files prior to mapping the virtual drive, there is no loss of data because of this.

You do not have to use either the working folder or its alternate. You can select a new working folder—just for StarDisk. If you specify a StarDisk working folder, StarDisk can leave it on your workstation or delete it when the view is no longer mapped to the virtual drive.

If you want the default working folder, you can skip the rest of this section.

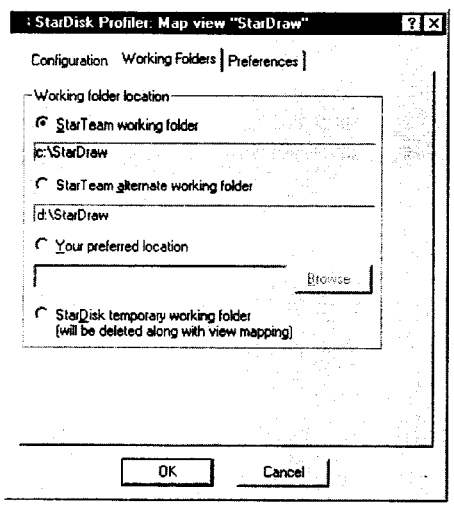

To specify a non-default working folder for the view's root folder:

1. From the StarDisk Profiler, select the Working Folders tab to specify a working folder for the view.

2. Select one of the following options:
   - StarTeam working folder
   - StarTeam alternate working folder
   - Your preferred location (which will remain on the workstation even after the view mapping is deleted)

Type or browse for the complete path to this folder.

- StarDisk temporary working folder (which is deleted when the view mapping is deleted)

StarDisk places the files in the Temp or Tmp folder for the operating system.

If you use the temporary folder and your system hangs for some reason, you can lose the data not already checked in from the virtual drive.

3. Go on to the procedure in the next section, "Setting View Preferences."

Setting View Preferences

Use the Preferences tab to control how StarDisk represents the contents of the mapped view. You can determine what folder hierarchy to display and whether or not to check out out-of-date files automatically. Selecting either the typical or reference folder profile displays the default settings for that profile. You can, however, customize the options to fit your needs.

To set view preferences:

1. From the StarDisk Profiler, select the Preferences tab to set view preferences.

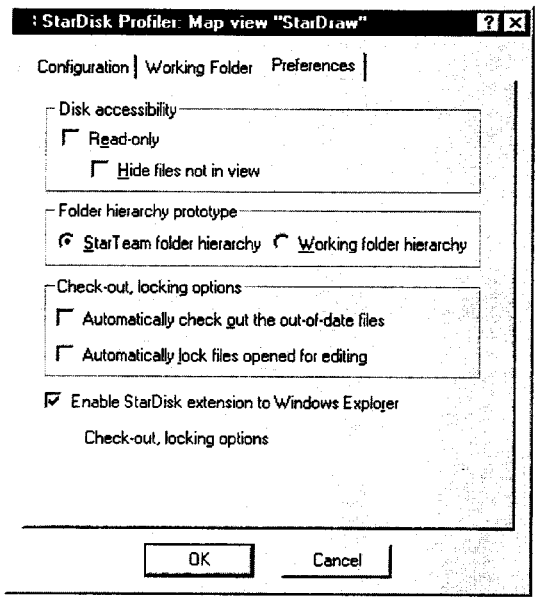

2. (Optional.) Limit access to files.
   a. Select the Read-only check box to prohibit changes to the virtual drive. This includes:
      - Changes to the contents of files opened from the virtual drive
      - The creation, deletion, and renaming of files and folders on the virtual drive
   b. (Optional.) If you selected the Read-only check box, you can select or clear the Hide Files Not In View check box.

When selected, StarDisk ignores any files stored in the working folders that do not belong to the view. Otherwise, they are visible from the virtual drive.

3. Select one of the following hierarchies:

- StarTeam Folder Hierarchy to use the same folder hierarchy on the virtual drive as that displayed in StarTeam for this view. Often, the StarTeam hierarchy differs from the working folder hierarchy.

The following figure shows the StarTeam folder hierarchy mapped on to drive E:\.

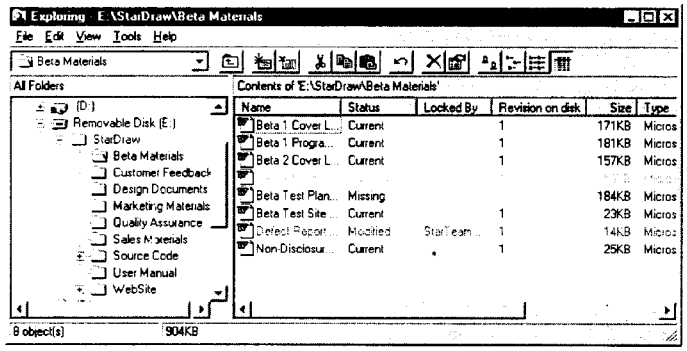

- Working Folder Hierarchy to recreate on the virtual drive the path to each working folder as it appears on your hard drive.

For example, the root folder for the view might be Source Code, but its working folder path might be C:\StarTeam\StarDraw\Source. In this example, the working folder path is longer and the folder has a different name.

If you are compiling or building software components, the Working Folder Hierarchy option is recommended. Otherwise, the compiler that relies on between-folder dependencies might not be able to locate specific files.

When using virtual drives, you must also avoid hard-coded drive names and paths, for example, C:\StarDraw\Source Code\star.cpp.

The following figure shows the working folder hierarchy for StarDraw mapped to the E: drive. Notice that the On_C folder indicates the drive from which the working folders originated. If the StarDraw working folder were not at the root of the C, the additional folders in its path would be shown. There is a high correlation between the names of the folders in the StarTeam folder hierarchy and the working folder hierarchy for StarDraw, but that does not have to be the case.

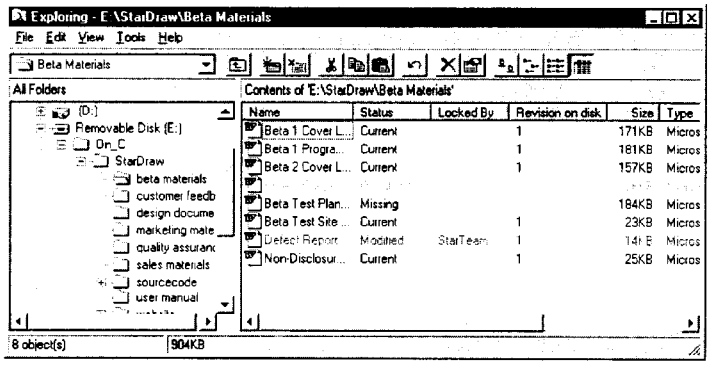

4. (Optional.) Select the Automatically Check Out The Out-of-Date Files check box to enforce synchronization of the workspace and repository files.

Whenever you open an out-of-date file, it will be automatically updated.

This is a time-consuming option. If you expect a high level of file system activity, it is best to check out out-of-date files initially using the Configure Workspace dialog (see "Configuring the Workspace" on page 26) and periodically using the Check Out dialog (see "Checking Files Out" on page 40).

5. (Optional.) Select the Automatically Lock Files Opened For Editing check box to lock every file that you open in an editor.

If the file is already locked by someone else, you will not be allowed to edit it. If the view containing the file is read-only, the file will not be locked when you open it, but you will not be allowed to check the edited file in to StarTeam.

6. (Optional.) If you do not want to see the file status, the name of the person who has exclusively locked the file, and the number of the revision on your workstation in Windows Explorer's right pane, clear the Enable StarDisk Extension To Windows Explorer check box. The box is selected by default.

If you are using StarDisk to perform a build, clear this check box.

7. If you set the Configure Workspace check box in the section "Configuring the View" on page 16, go on to the next section. Otherwise, you are ready to go to Windows Explorer.

 NOTE

You can change your preferences about hiding files, read-only access, checking out out-of-date files, and automatically locking files as they are opened using Explorer's Property dialog. See "Reviewing Properties" on page 48. However, you cannot change the folder hierarchy unless you Delete the Mapping and remap the drive. See "Deleting the Mapping" on page 51.

Configuring the Workspace

If you selected the Configure Workspace check box located on the Configuration tab of the StarDisk Profiler dialog, you can make changes to the data that already resides on your hard drive before StarDisk maps the virtual drive.

As you exit the StarDisk Profiler, the Scanning Workspace dialog displays statistics about the files currently found in the working folders. For example, it indicates how many working files are current, missing, and unknown. It also provides information about files and folders that are not in the view but are in its path.

Then the Configure Workspace dialog opens. The colored squares along the left edge of this dialog indicate the color in the pie chart represented by the Unknown, Current, Missing, and other files. The check boxes and option buttons on the right allow to make changes to the data that already resides on your hard drive. For example, you can check out out-of-date files and delete files that are not in the view.

None of your selections affect the behavior of the virtual drive after StarDisk maps the view to it. The virtual drive is controlled by the options you selected in the Preferences tab, changes you make to your StarDisk preferences using Explorer's Property dialog for the Removable Disk, and actions you take while using the virtual drive.

For example, checking out out-of-date files from the Configure Workspace dialog checks them out before the mapping. To check out out-of-date files after the mapping, you must select Automatically Check Out Out-of-date Files in the Preferences tab or in Explorer's Properties dialog.

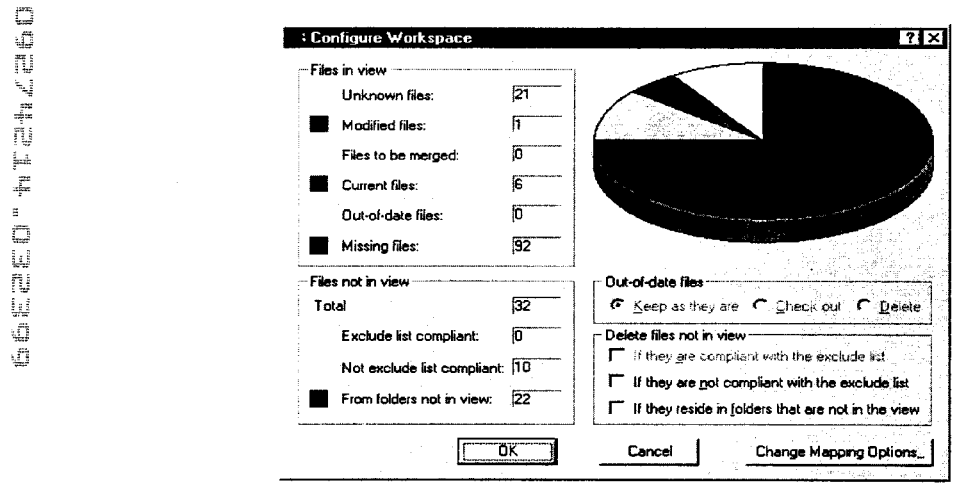

To configure the workspace:

1. (Optional.) Select an Out-of-date Files option:
   - Keep As They Are to leave the file status unchanged after the view has been mapped.
   - Check Out to have the latest revisions of these files checked-out to your working folder.

This option is strongly recommended if you intend to be working on the out-of-date files. Checking out all of those files now is much faster than using the Automatically Check Out the Out-of-date Files preference (which checks out the latest revision as you use an out-of-date file). You may choose to use both, so that files that become out-of-date after the view is mapped will be automatically checked-out. Another alternative is to check out the out-of-date files periodically using the Check Out dialog (see "Checking Files Out" on page 40).
   - Delete to remove these files from your working folder.

2. (Optional.) Select a Delete Files Not In View option:
   - If They Are Compliant With The Exclude List These are the excluded files.
   - If They Are Not Compliant With The Exclude List These are the non-excluded files.
   - If They Reside In Folders That Are Not In The View Remember deleting files removes them from your hard drive. The deleted files are no longer available in either the actual working folders or the virtual folders.

If you selected Hide Files Not In View as a preference, none of these files are available from the virtual drive whether or not you delete them.

☆ NOTE

To create or review a folder's exclude list, select Folder⇨ Properties from the menu bar in StarTeam.

Using Virtual Drives

StarDisk maps a view using both the StarTeam repository and the working folders on your hard drive as sources. After mapping a view, the virtual drive appears in your Explorer window and displays the following:
- All the files and folders in the view are in the working folders. The status of each file is the status it has in the working folder.
- All the files and folders in the view that are missing from the working folders.

StarDisk checks out a missing file from the StarTeam repository automatically whenever you open it. You can also check it out manually using StarDisk's extensions to Explorer.
- Unless you selected Hide Files Not In View as a preference, the virtual drive also displays one of the following:
   - Any additional descendants of the view's root working folder—if you selected StarTeam Folder Hierarchy as a preference.
   - Any additional descendants of the root of the working folder for the project—if you selected Working Folder Hierarchy as a preference.

For example, suppose the Project StarDraw has several views. The initial view (also called StarDraw) has C:\StarDraw as its root working folder. Another view named Web2 has C:\StarDraw\website\Web2 as its root working folder. Now suppose you map Web2 to the E drive.

If you selected StarTeam Folder Hierarchy, you see all the child folders of C:\StarDraw\website\Web2. The folders in the view have the names they have in the view. The folders that are not in the view have the paths they have on your hard drive.

If you selected Working Folder Hierarchy, you see all the child folders of C:\StarDraw. All the folders have the paths they have on your hard drive.

If you checked out and edited a file named Marketing Requirements.doc prior to creating the virtual drive, the Marketing Requirements.doc file in the virtual folder is identical to the file in the working folder. If you open that file from the virtual drive and make additional changes, the file in the working folder will also have those changes. These two files are the same file—just displayed in two different ways.

With StarDisk, you can open files directly with associated applications. For example, if you have a Microsoft Developer Studio file (.cpp), you can double-click the file in Explorer and open it in the associated application. You can also open it from Microsoft Developer Studio directly.

Suppose that the view that contains Marketing Requirements.doc also contains User Survey Results.doc, a file that you did not check out before you created the virtual drive. The virtual drive displays that "Missing" file so that you can open it if you choose. If you open User Survey Results.doc, that file is copied to your working folder.

Deleting files that are not in the view deletes them permanently from your hard drive. However, deleting a working file from the virtual drive is the same as deleting it from that file's usual working folder. The reverse is not true. If you delete a file from the working folder, it still appears on the virtual drive because it is a file with the status Missing.

Deleting a working file from the virtual drive (or from the working folder) never removes that file from the StarTeam repository. Files deleted from the virtual drive reappear if you check them out from StarTeam or refresh the virtual drive. (See "Refreshing Virtual Drives" on page 52 for details.)

If you rename a file, it has the new name on the virtual drive and in the working folder.

StarDisk adds commands to the standard Explorer pop-up menu so you can manage files stored on the virtual drive. For example, the StarDisk submenus provide file check-in and check-out.

Understanding File Statuses

A file's status indicates the relationship between the working file on your workstation and the most recently checked-in revision of the same file stored in StarTeam. The status determines what you would want to do to the file and what StarDisk can and cannot do to it. For example, if a file's status is Out Of Date, you would want to check it out; it is Modified, you would probably want to check it in. The following table explains each of StarTeam's file statuses.

  NOTE

Windows NT opens the file (and, therefore, forces StarDisk to check it out) whenever you right-click the file to select a menu command. Only files with the statuses Missing or Out Of Date behave in an unexpected way. For example, in Windows NT the status property for a missing file will always be Current when you view the Property dialog or perform an Update Status operation and the status for an out-of-date file will become Current even if you are not using the Automatically Check Out The Out-of-Date Files option.

| Status | Explanation |
| --- | --- |
| Current | These files are up to date. They are copies of the most recently checked in revisions of the StarTeam file. |
| | The information about current files in Windows Explorer is in black by default. |
| Missing | These files are not found in the working folder on your workstation. However, they are automatically checked out by StarDisk when you open them. |
| | The information about missing files in Windows Explorer is in black by default. |
| Merge | These files have been modified by you, but the revisions you started with are now out-of-date. When you check in a text file with this status, StarDisk starts StarTeam's Visual Merge utility which performs a three-way comparison of your file, the most recently checked-in revision, and the ancestor revision common to both your file and the most recently checked-in revision. It suggests a merged file that you can edit and check in. StarDisk also lets you perform a forced check in or forced check out of this file. |
| | The information about missing files in Windows Explorer is in blue by default. |
| Modified | These files have been changed by you. StarDisk allows you to check in these files using the StarTeam commands on Explorer's pop-up menu. Information about modified files in Windows Explorer is in red by default. |

Chapter 2: Using StarDisk 31

| | |
|---|---|
| Not In View | These files are not under StarTeam version control. They can be added to the view, but they are not currently in StarTeam. |
| | The information about not-in-view files in Windows Explorer is in black by default. |
| Out Of Date | These files have had new revisions checked in since the last time you checked them out. |
| | If you selected Automatically Check Out The Out-of-Date Files as a preference, these files are also automatically checked out by StarDisk when you open them. |
| | Information about out-of-date files in Windows Explorer is in green by default. |
| Unknown | These files do not have a recognizable status. StarDisk does not allow you to check files with the Unknown status in or out—unless you do a forced check in or a forced check out. It is best to update the status of these files before using them from StarDisk. |
| | The information about current files is in gray by default. |

If you are using the StarDisk extension to Windows Explorer, the status appears in the Status column in the right pane. You may need to refresh the pane (press F5) or recompute the status to be certain it is correct.

To update a file's status:

1. Select one or more files and folders from the right pane and right-click.

The Explorer pop-up menu opens.

2. Select StarDisk⇨ Update Status.

The status is recomputed for the selected files, the files in the selected folders and their child folders.

 TIP

You can also update the status of all the files in a folder and its child folders by right-clicking a folder in the left pane and selecting StarDisk⇨ Update Status....

To determine a file's status when you are not using the extension to Windows Explorer:

1. Select a file and right-click.

The Explorer pop-up menu opens.

2. Click Properties....

The Explorer Properties dialog opens.

3. Select the StarDisk tab.

For files in the view, the status appears at the top of the dialog. For a file that is not in the view, the only property listed is its actual (rather than virtual) path.

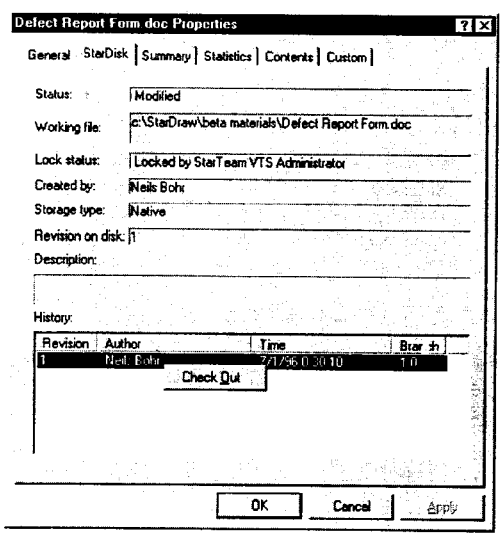

Changing the Color Scheme for Statuses

The information about files is color-coded in Windows Explorers. For example, if a file's status is Modified, the information about the file appears in red. You can change the font and/or colors to suit your personal preferences.

To change the fonts or colors:

1. Do one of the following:
    - From Windows Explorer's menu bar, select View ⇨ Fonts and Colors....
    - Without selecting a file, right-click in the Windows Explorer right pane.

Select View ⇨ Fonts and Colors... from the pop-up menu.

The Assign a Font and Color to File Status dialog opens.

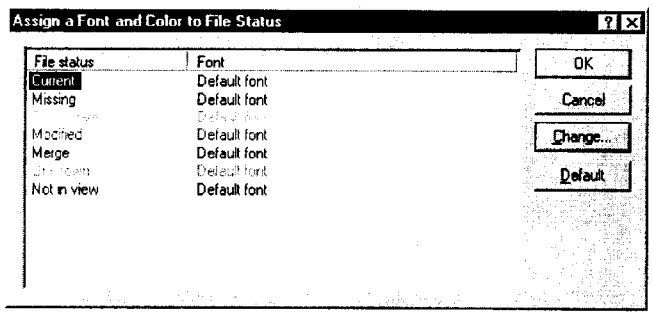

2. Select a status form the list box.

3. Click Change....

The Windows standard Font dialog opens.

4. Select your preferred settings.

5. Click OK to return to the previous dialog.

6. Repeat steps 3 through 6 for other file statuses.

 NOTE

Clicking the Default button changes the fonts and colors to your default settings for Windows.

Sorting the Data about Files

You can sort the file information based on the values in the columns added Windows Explorer's right pane.

To sort the file information based on file status, lock owner, or revision:
- Do one of the following:
    - Click the Status, Locked By, or Revision On Disk column header to sort the files based on their values in that column.

This sort will be in ascending order. Click once more to sort the data in descending order.

- Select View ⇨ Arrange Icons... from Explorer's menu bar or pop-up menu.

Then select By Status, By Lock Owner, or By Revision On Disk from the Arrange Icons submenu.

Adding Folders to the View

You can add folders to the StarTeam view from StarDisk. This action puts those folders in the StarTeam folder hierarchy. Their working folders are relative to the working folders of their parent folders in the StarTeam hierarchy.

To add folders to the view:

1. Select one or more folders that are not in the view and right-click.

The Explorer pop-up menu opens.

2. Select StarDisk⇨Add to View....

The Add Folder dialog opens.

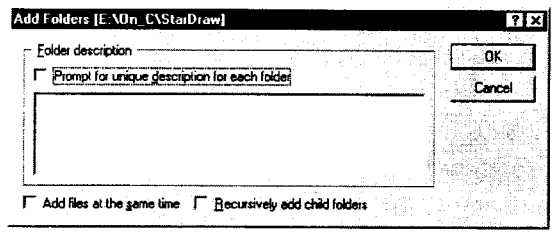

3. (Optional.) Do one of the following:

- Select the Prompt For Unique Description For Each Folder check box to provide a different description for each folder.
    - Type a description to be used for all the folders in the Folder Description text box.

4. (Optional.) Select the Add Files At The Same Time check box to add the files in each folder to the newly created StarTeam folder.

5. (Optional.) Select the Recursively Add Child Folders check box to add the children, grandchildren, and so on for each of the folders.

Adding Files to the View

You can add files to the StarTeam view from StarDisk. This action puts those files under StarTeam's version control. Then each revision of each file can be recreated at a later time from the data in StarTeam's repository.

For example, if you create a new document or split a document into two different documents. The new document needs to be added to StarTeam.

To add new files to the view:

1. Select one or more files whose status is Not In View and right-click.

The Explorer pop-up menu opens.

2. Select StarDisk ⇨ Add To View....

The following Add Files dialog opens if you selected only files.

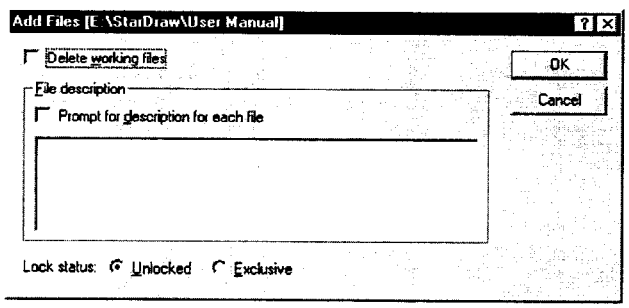

3. (Optional.) Select the Delete Working Files check box to delete the working file from the working folder (and, therefore, from the virtual drive).

You will still see the file listed on the virtual drive but its status becomes Missing.

4. Do one of the following:
   - Type a generic description for all files in the File Description text box.
   - Select the Prompt for Description for Each File check box.

5. Select one of the My Lock Status option buttons. You can lock the files exclusively or non-exclusively or leave the files unlocked at this time.

Your lock choice lets other team members know that you are working on this file. An exclusive lock means you intend to change this file.

☆ NOTE

Before you add a file to the view, make sure no applications have the file open. Otherwise, a sharing violation will occur.

StarDisk User's Guide

Checking Files In
You can check files in to StarTeam using StarDisk.
To check in files manually:
1. Select one or more files and right-click.
   The Explorer pop-up menu opens.
2. Select StarDisk⇨Check In.
   The following Check In dialog opens if you selected only files.
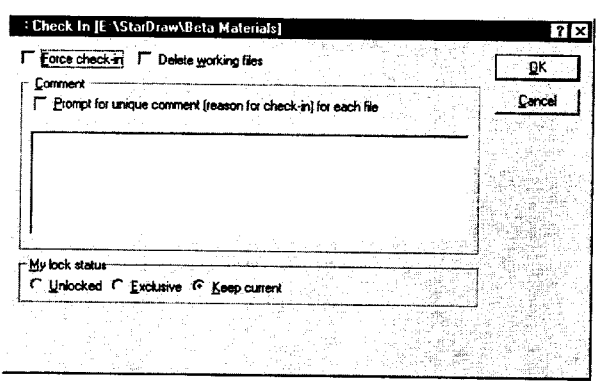

The following Check In dialog opens if you selected at least one folder.

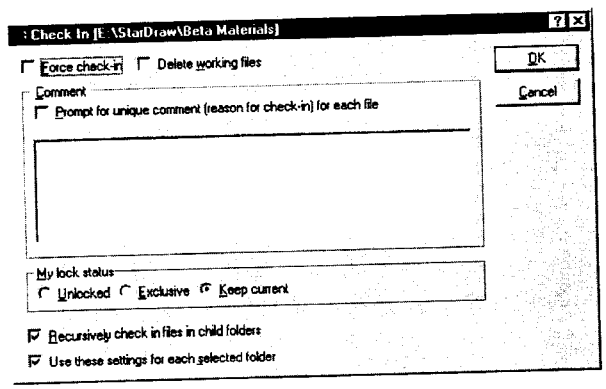

3. (Optional.) Select the Force Check-In check box to check in the working file regardless of its status. For example, you can check in a file whose status is out-of-date even though a newer file exists.

4. (Optional.) Select the Delete Working Files check box to delete the corresponding working files from their working folders (and, therefore, from the virtual drive).

You will still see these files listed on the virtual drive but their status becomes Missing.

5. Do one of the following:
   - Provide a generic comment or reason why you are checking in these files in the Comment text box.

This reason will be stored in the StarTeam repository.

- Select the Prompt For Unique Comment (Reason For Check-in) For Each File check box to provide a separate comment for each file during the check-in process.

6. Select a My Lock Status. The file will have this status after the check-in.
   - Unlocked to indicate that the file is no longer locked by you.
   - Exclusive to indicate that you don't want anyone else to be using this file.
   - Keep Current to indicate that the lock status will not change.

7. (For folders only.) Select the Recursively Check In Files From Child Folders check box to check in all the files that can be checked in from the folder's children.

8. (For folders only.) All the option settings you have selected so far can apply to:
   - All the selected folders if you select the Use These Settings For Each Selected Folder check box.
   - Only the first of the selected folders if you clear the check box.

If you clear the check box, the Check In dialog will reopen for each folder allowing you to change your settings.

 TIP

From Windows Explorer's left pane, you can check in all the files in a folder and its child folders by right-clicking the folder and selecting StarDisk⇨ Check In....

Checking Files Out

You can check files out of StarTeam using StarDisk. It offers both a Check Out dialog and a History dialog for this purpose.

To check out files manually:

1. From Windows Explorer's right pane, select one or more files and folders and right-click.

The Explorer pop-up menu opens.

2. Select StarDisk⇨Check Out.

The following Check Out dialog opens in you selected only files.
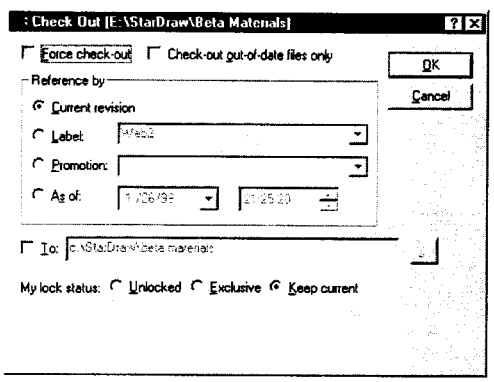
The following Check Out dialog opens in you selected at least one folder.
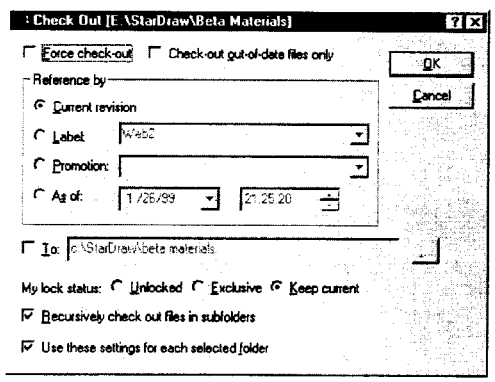

3. (Optional.) Select Force Check-Out to check out the file from the repository and overwrite the file on your working folder, regardless of the file's status.

4. (Optional.) Select the Check-out Out-of-date Files Only check box to check out only the selected files with the status Out Of Date.

This is an alternative to the automatic check-out option explained in "Setting View Preferences" on page 22 and "Reviewing Properties" on page 48.

5. Indicate what revision of the file you want by selecting one of the following options:
   - Current Revision to check out the most recent revision of each selected file.
   - Label to check out the revision of each of the selected files that has a specific view or revision label. (If the selected file does not have the label, no revision is checked out for that file.)
     - Select the label from the Version Label drop-down list box.
   - Promotion State to check out the revision that was the latest at the specified date and time.
   - As Of to check out the revision that was the latest at the specified date and time.
     a. Click the button between the date and the time to use the calendar.
        Specify the date using the next and previous month buttons and the arrow keys.
     b. To specify the time, type the time or use the spin boxes.

6. (Optional) Select the To check box if you want to check out the file to another folder and path. Then type the path to or browse for the new folder.

7. Select a My Lock Status:
   - Unlocked to indicate that the file is no longer locked by you.
   - Exclusive to indicate that you don't want anyone else to be using this file.
   - Keep Current to indicate that the lock status will not change.

8. (For folders only.) Select the Recursively Check Out Files From Child Folders check box to check out all the files that can be checked out from the folder's children.

Chapter 2: Using StarDisk 9. (For folders only.) All the option settings you have selected so far can apply to:
   - All the selected folders if you select the Use These Settings For Each Selected Folder check box.
   - Only the first of the selected folders if you clear the check box.

If you clear the check box, the Check In dialog will reopen for each folder allowing to change your settings.

 TIP

From Windows Explorer's left pane, you can check out all the files in a folder and its child folders by right-clicking the folder and selecting StarDisk⇨ Check Out....

Checking out a file revision using the History dialog:

1. Select a file and right-click.

The Explorer pop-up menu opens.

2. Select StarDisk⇨Check Out from History....

The Check Out from History dialog opens.

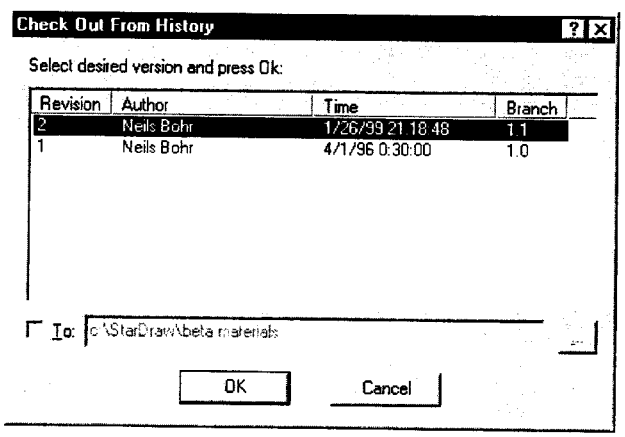

3. Select the revision to be checked out.

4. (Optional) Select the To check box if you want to check out the file to another folder and path. Then type the path to or browse for the new folder.

5. Click OK.

StarDisk does a fast check-out of the revision. The Check Out dialog does not open.

 NOTE

You can also check out a file revision from the History list box on the StarDisk file properties dialog.

However, if the Automatically Check Out Out-of-date Files check box has been selected as one of the properties for the removable disk folder, you can check out an earlier revision only to a new location (using the To check box). The figure in "Reviewing Properties" on page 48 show the removable disk folder's properties.

Chapter 2: Using StarDisk

Locking and Unlocking Files

You lock a file to make other users aware of the fact that you are editing it. You unlock it when you no longer need it. If you will be the only person using this file, you can keep it locked through several check-ins. Often you will lock or unlock a file as part of the check-in or check-out process rather than use the Lock dialog.

To lock or unlock files:

1. Select one or more files and folders and right-click.

The Explorer pop-up menu opens.

2. Select StarDisk⇨Lock/Unlock....

The following Lock dialog opens if you selected only files.

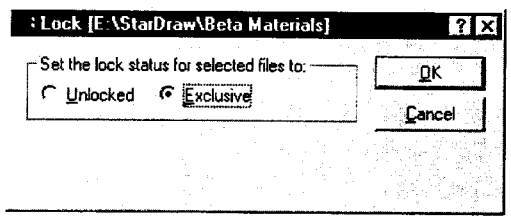

The following Lock dialog opens if you selected at least one folder.

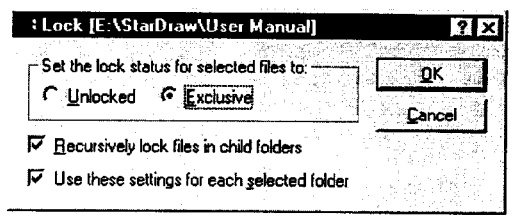

StarDisk User's Guide

3. Select a lock status:
   - Unlocked to indicate that the file is no longer locked by you.
   - Exclusive to indicate that you don't want anyone else to be using this file.

4. (For folders only.) Select the Recursively Lock Files From Child Folders check box to lock all the files in the folder's children.

5. (For folders only.) All the option settings you have selected so far can apply to:
   - All the selected folders if you select the Use These Settings For Each Selected Folder check box.
   - Only the first of the selected folders if you clear the check box.

If you clear the check box, the Check In dialog will reopen for each folder allowing you to change your settings.

 TIP

You can lock all the files with the Not In View status in a folder and its child folders by right-clicking the folder and selecting StarDisk⇨ Lock/Unlock....

Comparing File Revisions

You can use Visual Diff, a StarTeam utility, to compare the copy of the file in your working folder with the most recently checked-in revision in StarTeam. This is especially useful for text files, but it can be helpful with binary files—especially if your main concern is if the two are identical. For more information about Visual Diff, see "Chapter 12: Using Visual Merge and Visual Diff" in the *StarTeam User's Guide*.

To compare the working file with the current revision:

1. Select a file and right-click.

The Explorer pop-up menu opens.

2. Select StarDisk⇨Compare....

StarDisk starts Visual Diff. Visual Diff lets you know that the two are identical or displays the two files so that you can review their differences.

Reviewing Properties
StarDisk adds the StarDisk tab to Explorer's Properties dialog. The Removable Disk has properties that you can change. You can change some of the preferences you set when you initially mapped the drive.
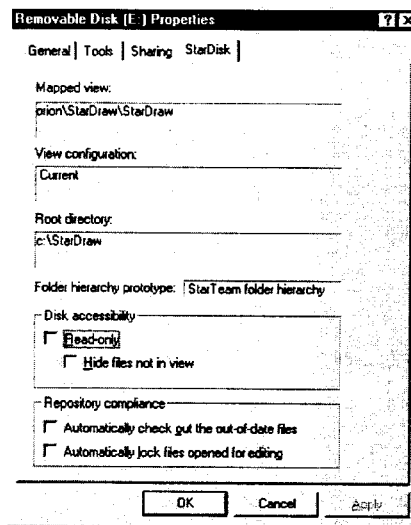

Other folders' properties tell their working folders, creator, and description.
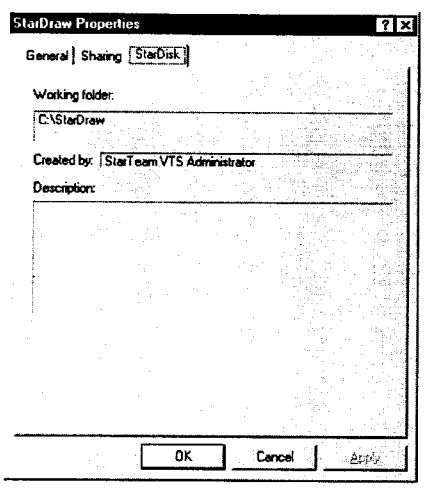
StarDisk User's Guide The next folder shows what the Properties dialog might look like for a folder in the working folder path that is not a working folder for a StarTeam folder. Notice that it is created by StarDisk.

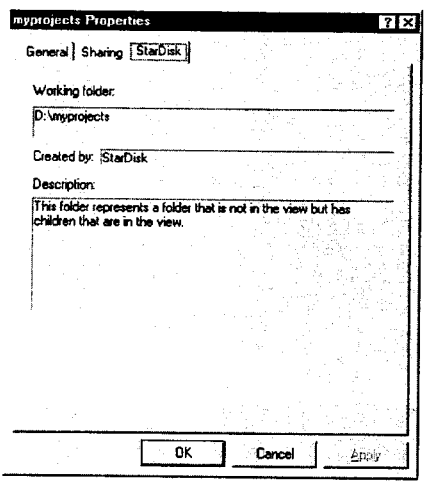

To change your preferences:

1. Select the Removable Disk and right-click.

The Explorer pop-up menu opens.

2. Select Properties.

The Properties dialog opens.

3. Select the StarDisk tab.

Chapter 2: Using StarDisk 51

4. Select or clear the appropriate check boxes. For more information, see "Setting View Preferences" on page 22.

Disabling the Extension to Windows Explorer

You can turn the extension to Windows Explorer on and off for the virtual disks you have mapped.

To enable or disable the extension to Windows Explorer:

1. From Explorer's left pane, select the virtual drive's root folder, for example, Removable Disk (E:) and right-click.

The Explorer pop-up menu opens.

2. Select StarDisk⇨ Enable StarDisk Extension to Explorer or StarDisk⇨ Disable StarDisk Extension to Explorer.

The columns of StarTeam data in the right pane appear or disappear. These columns are Status, Lock Owner, and Revision On Disk.

Deleting the Mapping

You can remove a mapped view using StarDisk.

To remove a mapped view:

1. Do one of the following:
    - Open the View Browser, select the virtual drive and click Delete Mapping.
    - Right-click the Removable Disk in Explorer, select StarDisk⇨ Delete Mapping.

A message box asks you to confirm.

2. Click Yes.

If your view is using StarDisk's temporary working folder (which will be deleted along with the mapping), you are asked:

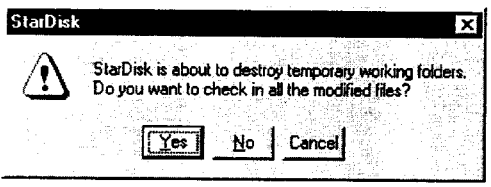

3. Click Yes to check in all modified files before they are deleted or No to keep your changes out of StarTeam.

If you selected Yes, the Check In dialog opens. Follow the steps in "Checking Files In" on page 37.

☆ NOTE

You cannot delete the mapping if you have files from the virtual drive open. You must close these files and exit the applications in which they were opened before you delete the mapping.

Refreshing Virtual Drives

Use the refresh option to update the virtual drive's contents and properties. During the refresh process, you cannot access the virtual drive.

The refresh process restores all the files in the view that you have deleted or renamed on the virtual drive. It also updates statuses and synchronizes the contents of the virtual drive with the contents of the view. For example, if files or folders have been added to the view, they will appear on the virtual drive.

To refresh a virtual drive:

1. Right-click the mapped drive.

The Explorer pop-up menu opens.

2. Select StarDisk⇨Refresh.

A message box lets you know that the refresh has been performed and that the virtual drive is again accessible.

3. Click OK.

☆ NOTE

You can also refresh drives by:
- Selecting Refresh All Virtual Disks from the StarDisk pop-up menu. You right-click the icon on the taskbar to see this menu.
- Selecting Refresh Virtual Disk or Refresh All Disks from the StarDisk View Browser dialog.

Exiting StarDisk

The View Browser icon  remains on your desktop for fast access to StarTeam via Star-Disk. To exit the view browser and remove the icon from your desktop, you have to delete the mapped drives. For details about deleting mapped drives, see "Deleting the Mapping" on page 51.

To exit StarDisk:
- Do one of the following after you have deleted all mapped drives:
  - From the StarDisk View Browser, click Exit StarDisk.
  - Right-click the StarDisk View Browser icon  and select Exit from the pop-up menu.

Chapter 2: Using StarDisk 55

Index

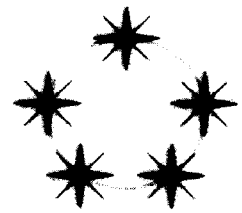

Symbols
.ini files
 desktop.ini 6
 sdnsent.ini 6
 StarTeam.ini 5

A
adding
 files to StarTeam views 36
alternate working folders 20
as of configurations 18

B
builds 13

C
changing
 preferences 50
checking in
 files 37
checking out
 files 29, 40
 out-of-date files 25, 28
closing
 StarDisk 53
colors
 file statuses 34
comparing
 file revisions 47
configurations
 as of 18
 labeled 18
 promotion state 18

Configure Workspace dialog 26
configuring
 workspace 26
Current file status 31
customizing
 mapped views 22

D
deleting
 files not in view 28
 mapping 51
desktop.ini 6
dialogs
 View Browser 15
disabling
 StarDisk Extension to Windows Explorer 26, 51
 StarDisk from starting automatically 3
displaying folders/files on virtual drive 22
drives
 mapping views on virtual drives 14
 properties 48
 refreshing 52
 virtual 29

E
editing
 files 25 enabling
    read access only 23
    StarDisk Extension to Windows Explorer 26, 51
environment variables
    StarTeam 4
excluding
    files 28
exiting
    StarDisk 4, 53
Explorer
    displaying virtual folders and files 22
extensions to Windows Explorer
    disabling 26, 51
    enabling 26, 51

F file revisions
    comparing 47
file statuses 33
    colors 34
    Current 31
    fonts 34
    Missing 31
    Modified 31
    Not In View 32
    Out Of Date 32
    Unknown 32
    updating 32
files
    adding to StarTeam views 36
    checking in 37
    checking out 25, 28, 29, 40
    comparing revisions 47
    deleting files not in view 28
    determining file statuses 33
    excluding 28
    hiding 23, 29
    locked automatically when opened for editing 25 locking 45
    missing 30
    properties 12
    renaming 30
    sorting data about 35
    statuses 30
    unlocking 45
    updating statuses 32
folders
    hierarchies 24
    properties 49
    reference 14
    StarDisk working folders 20
    temporary 20
    working 19
fonts
    file statuses 34

H hardware requirements 2
hiding
    files 23, 29
hierarchies
    folders 24

I ini files
    desktop.ini 6
    sdnsent.ini 6
    StarTeam.ini 5
installing
    StarDisk 3
introduction to StarDisk 9
IPX/SPX 2

K keep current lock status 39

L labeled configurations 18
Light-weight RPC 2 lock status
 exclusive 39
 keep current 39
 unlocked 39
locking
 files 45
 files automatically when opened for editing 25

M
mapped views
 customizing 22
mapping
 deleting 51
 views on virtual drives 14
memory requirements 2
menus
 Windows Explorer 11
missing
 files 30
Missing file status 31
Modified file status 31

N
Named Pipes 2
NetBEUI 2
NetBIOS/NetBEUI 2
Not In View file status 32
not-in-view files 28

O
operating systems 2
Out Of Date file status 32
out-of-date files 25, 28

P
preferences
 changing 50
Preferences dialog 22
promotion state configurations 18
properties
 changing preferences for virtual drives 50
 files 12
 folders 49
 virtual drives 48
protocols 2

R
read-only 23
reference folders 14
refreshing
 virtual drives 52
Removable Disk folder 50
renaming
 files 30
requirements 1

S
scanning workspace 26
sdnsent.ini 6
sorting
 file information 35
StarDisk
 disabling 3
 exiting 4, 53
 installing 3
 starting automatically 3
 starting manually 3
StarDisk introduction 9
StarTeam environment variable 4
StarTeam folder hierarchy 24, 29
StarTeam.ini 5
starting
 StarDisk 3
statuses
 colors 34
 Current 31
 files 30, 33
 fonts 34
 Missing 31
 Modified 31
 Not In View 32
 Out Of Date 32

Unknown 32
    updating 32
storage requirements 2
supported protocols 2
system compatibility 1
system requirements 1
system specifications 1
T
TCP/IP (RPC) 2
TCP/IP (Sockets) 2
U
Unknown file status 32
unlocked lock status 39
unlocking, files 45
updating
    file statuses 32
using
    StarDisk 9
    virtual drives 29
V
variables
    StarTeam 4
version control 9
View Browser dialog 15
views
    adding files 36
    alternate working folders 20
    mapping on virtual drives 14
    working folders 19 virtual drives 29
    mapping views 14
    properties 48
    refreshing 52
W
Windows Explorer
    extended menus 11
working folder hierarchy 24, 29
working folders
    alternates for view 20
    selecting for view 19
    StarDisk 20
    temporary 20
workspace
    configuring 26
    scanning 26

It is claimed:

1. A method of representing data as files in a data processing system, the data processing system comprising:

an operating system having a default view component for providing default file attributes of files in a file system in a default view, the default view component of the operating system being accessible to applications programs;

one or more mass storage devices, each mass storage device comprising one or more logical disks, each logical disk storing a file system, the file systems comprising files, the file systems including names, attributes and locations of the respective files stored in the respective file systems;

one or more file system drivers, each file system driver comprising function routines and file management structures for providing file access services to the operating system with respect to at least one of the file systems, wherein the file system drivers each provide a single representation of the respective file systems; and a view application for providing configurable views of the files in the file systems, the configurable views including custom file attributes which are not available in the default views provided by the default view component of the operating system;

the method comprising:

(a) requesting by one of the applications programs a first view of a first defined part of one of the file systems;

(b) the default view component of the operating system providing a default view of the first defined part;

(c) requesting by one of the applications programs a second view of a second defined part of one of the file systems;

(d) substituting the view application for the default view component of the operating system with respect to the second defined part;

(e) the view application providing a non-default view of the second defined part.

2. The method of representing data as files in a data processing system of claim 1 wherein the step of the view application providing the configurable view comprises the view application obtaining from a data repository system the default file attributes and the custom file attributes.

3. The method of representing data as files in a data processing system of claim 2, wherein the data repository system comprises a version control system and the custom file attributes include, for each of the files in the second portion:

a status of the file, if a user has gained exclusive control of the file, a name of the user, and a revision number of the file.

4. The method of representing data as files in a data processing system of claim 2 wherein the file systems comprise a native file system and a virtual file system, the method further comprising the default view component providing views of the native file system and the view application providing views of the virtual file system.

5. The method of representing data as files in a data processing system of claim 4, wherein the custom attributes include, for each of the files in the second portion, a file status, and the file status for each file is one of:

Missing—the file is not in the native file system and the data repository system has a revision of the file;

Current—the file is in the native file system disk and the data repository system indicates that the file is the latest revision;

Modified—the file is in the native file system and is a modification of the latest revision of the file;

Merge—the file is in the native file system and is a modification of other than the latest revision of the file;

Out of date—the file is in the native file system is a copy of an old revision of the file and not changed from the old revision;

Not in view—the file is not under version control.

6. The method of representing data as files in a data processing system of claim 1 wherein the file systems comprise a native file system and a virtual file system, the method further comprising the default view component providing views of the native file system and the view application providing views of the virtual file system.

7. The method of representing data as files in a data processing system of claim 1 further comprising, (a) before the step of requesting by one of the applications programs a second view of a second defined part of one of the file systems, the step of storing in the second defined part user interface class identifier of the view application; and (b) the step of substituting the view application for the default view component of the operating system with respect to the second defined part further comprising the step of the operating system loading the view application.

8. A method of representing data as files in a data processing system, the data processing system comprising:

a mass storage device, the mass storage device comprising a native disk storing a native file system, the native file system comprising plural native files, the native file system including default file information for each file including a name, an attribute and a location of the file;

an operating system having a default view component for providing the default file information in a default view, the default view component of the operating system being accessible to applications programs;

a native file system driver comprising function routines and file management structures for providing file access services to the operating system with respect to the native file system, wherein the native file system driver provides a single representation of the native file systems; and the method comprising:

(a) installing a virtual file system driver in the data processing system, the virtual file system driver comprising function routines and file management structures;

(b) the virtual file system driver emulating a virtual file system to the operating system as an additional native file system, the virtual file system comprising virtual files, each virtual files representing an object;

(c) storing in the virtual file system user interface class identifier of the view application;

(d) a one of the applications programs requesting a view of a defined part of the virtual file system;

(e) substituting a view application for the default view component of the operating system with respect to the defined part of the virtual file system;

(f) loading the view application;

(g) the view application providing a custom view of the defined part of the virtual file system, the custom view including custom attributes relating to the objects.

9. The method of representing data as files in a data processing system of claim 8, wherein the custom attributes include a calculated attribute of the virtual files in the defined part.

* * * * *